United States Patent
Azami

(10) Patent No.: US 9,905,272 B2
(45) Date of Patent: Feb. 27, 2018

(54) VIDEO CAPTURE SYSTEM, INFORMATION PROCESSING TERMINAL, VIDEO CHECKING METHOD, AND PROGRAM

(71) Applicant: JVC KENWOOD Corporation, Kanagawa (JP)

(72) Inventor: Tomohiro Azami, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 24 days.

(21) Appl. No.: 14/984,975

(22) Filed: Dec. 30, 2015

(65) Prior Publication Data

US 2016/0260461 A1 Sep. 8, 2016

(30) Foreign Application Priority Data

Mar. 6, 2015 (JP) .................................. 2015-044487
Mar. 6, 2015 (JP) .................................. 2015-044488

(51) Int. Cl.
*H04N 5/232* (2006.01)
*G11B 27/031* (2006.01)
*G11B 27/34* (2006.01)

(52) U.S. Cl.
CPC ............ *G11B 27/34* (2013.01); *G11B 27/031* (2013.01); *H04N 5/23293* (2013.01)

(58) Field of Classification Search
CPC ... G11B 27/34; G11B 27/031; H04N 5/23293
See application file for complete search history.

(56) References Cited

U.S. PATENT DOCUMENTS

| | | | | |
|---|---|---|---|---|
| 2005/0264678 A1* | 12/2005 | Butterworth | ....... | H04N 5/23212 348/345 |
| 2010/0309335 A1* | 12/2010 | Brunner | ................. | H04N 5/144 348/231.6 |
| 2011/0081126 A1* | 4/2011 | Mizuno | .............. | H04N 1/00336 386/230 |
| 2013/0162853 A1* | 6/2013 | Kim | ................... | H04N 5/23293 348/220.1 |

FOREIGN PATENT DOCUMENTS

JP 2005-191770 7/2005
JP 2014-90499 5/2014

* cited by examiner

*Primary Examiner* — Hung Lam
(74) *Attorney, Agent, or Firm* — Procopio, Cory, Hargreaves & Savitch LLP

(57) ABSTRACT

Provided is a video capture system including: an information processing terminal; and an image pickup apparatus configured to be capable of communicating with the information processing terminal and capture a video in response to an instruction from the information processing terminal. The information processing terminal includes: a stop instruction unit configured to instruct the image pickup apparatus to stop capturing the video; a display still image acquisition unit configured to acquire a plurality of display still images in response to a stop instruction from the stop instruction unit, in which the plurality of display still images are extracted from the video captured by the image pickup apparatus; and a display unit configured to display a list of the plurality of display still images acquired by the display still image acquisition unit.

11 Claims, 20 Drawing Sheets

VIDEO CAPTURE SYSTEM, INFORMATION PROCESSING TERMINAL, VIDEO CHECKING METHOD, AND PROGRAM

CROSS REFERENCE TO RELATED APPLICATION

This application is based upon and claims the benefit of priority from Japanese patent application No. 2015-044487, filed on Mar. 6, 2015 and Japanese patent application No. 2015-044488, filed on Mar. 6, 2015, the disclosure of which is incorporated herein in its entirety by reference.

BACKGROUND

The present invention relates to a video capture system, an information processing terminal, a video checking method, and a program.

There is a technique for generating a still image such as a thumbnail or the like from a captured video. Regarding this technique, Japanese Unexamined Patent Application Publication No. 2014-90499 discloses an information processing apparatus that accurately presents contents of recorded video immediately after the video is captured while a user still has clear memories about the video. The information processing apparatus disclosed in Japanese Unexamined Patent Application Publication No. 2014-90499 includes a thumbnail generation control unit that generates a plurality of thumbnail images representing respective sections of timeshared moving images and a display control unit that instructs a display unit to display a check screen on which the plurality of thumbnail images are arranged in chronological order.

Further, Japanese Unexamined Patent Application Publication No. 2005-191770 discloses an apparatus that reliably generates a still image of an important scene when the still image is automatically extracted from highlight scene moving images. The apparatus disclosed in Japanese Unexamined Patent Application Publication No. 2005-191770 cuts out the corresponding highlight scene moving image from moving pictures captured by a camera. Next, when the still images are cut out from the moving pictures at a specified cutout density, this apparatus sets the cutout density to a high density around a particular time so as to extract the important scene as a highlight still image.

SUMMARY

An image pickup apparatus may be used to capture a video of, for example, a sports game, practice or the like, and check contents of the video captured by the image pickup apparatus on the spot. Time for checking the contents of a video is often limited at a sports game, practice or the like. In such a case, it is required for a user to find a scene a user desires to view in the captured video.

An aspect of the present invention is a video capture system including: an information processing terminal; and an image pickup apparatus configured to be capable of communicating with the information processing terminal and capture a video in response to an instruction from the information processing terminal. The information processing terminal includes: a stop instruction unit configured to instruct the image pickup apparatus to stop capturing the video; a display still image acquisition unit configured to acquire a plurality of display still images in response to a stop instruction from the stop instruction unit, in which the plurality of display still images are extracted from the video captured by the image pickup apparatus; and a display unit configured to display a list of the plurality of display still images acquired by the display still image acquisition unit.

Another aspect of the present invention is an information processing terminal including: a stop instruction unit configured to instruct an image pickup apparatus to stop capturing video; a display still image acquisition unit configured to acquire a plurality of display still images in response to a stop instruction from the stop instruction unit, in which the plurality of display still images are extracted from the video captured by the image pickup apparatus; and a display unit configured to display a list of the plurality of display still images acquired by the display still image acquisition unit.

Another aspect of the present invention is a video capture system including: a capture unit configured to capture a video; a stop instruction unit configured to instruct the capture unit to stop capturing the video; a display still image acquisition unit configured to acquire a plurality of display still images in response to a stop instruction from the stop instruction unit, in which the plurality of display still images are extracted from the video captured by the capture unit; and a display unit configured to display a list of the plurality of display still images acquired by the display still image acquisition unit.

Another aspect of the present invention is a method of checking video including: instructing an image pickup apparatus to stop capturing video, the image pickup apparatus being for capturing the video; acquiring a plurality of display still images from the video in response to a stop instruction, in which the plurality of display still images are extracted from the video captured by the image pickup apparatus; and displaying a list of the plurality of the acquired display still images.

Another aspect of the present invention is a non-transitory computer readable medium storing a program to cause a computer to execute: instructing an image pickup apparatus to stop capturing video, the image pickup apparatus being for capturing the video; acquiring a plurality of display still images from the video in response to a stop instruction, the plurality of display still images being extracted from the video captured by the image pickup apparatus; and displaying a list of the plurality of the acquired display still images.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Exemplary Embodiment

Hereinafter, exemplary embodiments of the present invention shall be explained with reference to the drawings.

Figure 1:
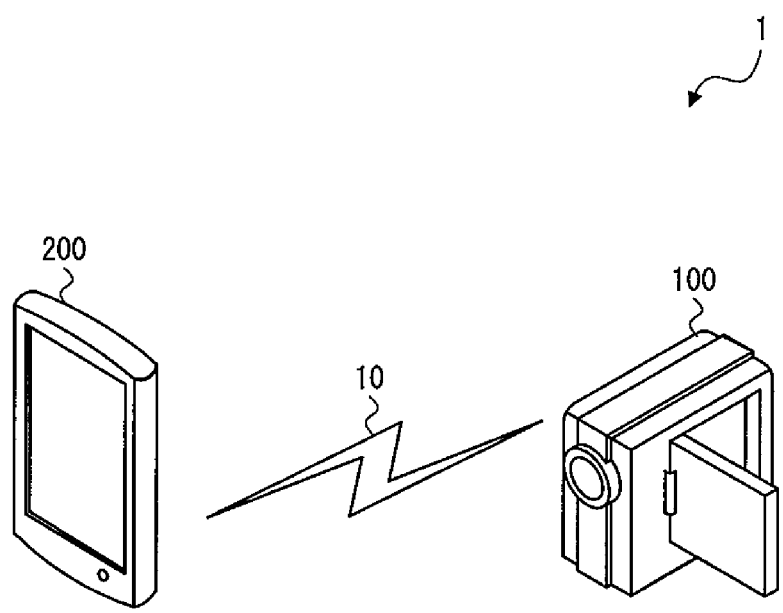
FIG. 1 is a drawing showing a video capture system according to a first exemplary embodiment.

FIG. 1 is a drawing showing a video capture system 1 according to a first exemplary embodiment. The video capture system 1 includes an image pickup apparatus 100 and an information processing terminal 200. The image pickup apparatus 100 is, for example, a camcorder, a video camera or the like. The image pickup apparatus 100 captures a video and records the captured video as moving image data. Further, the image pickup apparatus 100 is configured to extract, from the captured video, a plurality of still images of scenes respectively corresponding to predetermined time sections of the video. The image pickup apparatus 100 communicates with the information processing terminal 200 by, for example, a wireless communication such as WiFi or a wired communication. The details of the communication shall be explained later.

The information processing terminal 200 is, for example, a tablet terminal or the like. The information processing terminal 200 is preferably a mobile device that can be carried by a user. The information processing terminal 200 communicates with the image pickup apparatus 100 via a communication path 10 which is wireless, wired or the like. The information processing terminal 200 is configured to instruct the image pickup apparatus 100 to start or stop capturing a video. When the video capture is stopped, the information processing terminal 200 acquires a plurality of display still images corresponding to at least some of the extracted still images from the image pickup apparatus 100. The display still image is, for example, a thumbnail and is a still image which will be displayed in a list on the information processing terminal 200. The information processing terminal 200 displays the list of the plurality of acquired display still images. When the user selects the display still image that is displayed, the video is played from a position of the video corresponding to a time associated with the selected display still image. The details of such an operation shall be explained later.

Figure 2:
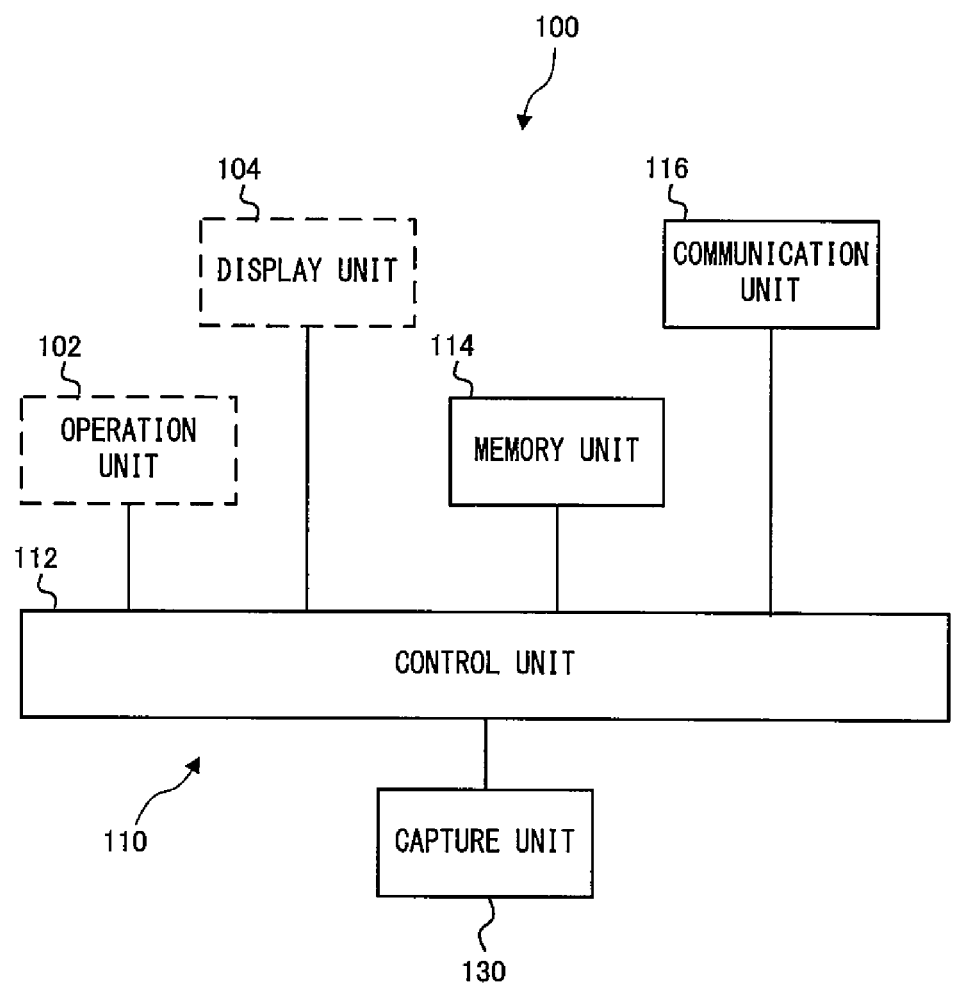
FIG. 2 is a drawing showing a hardware configuration of an image pickup apparatus according to the first exemplary embodiment.

FIG. 2 is a drawing showing a hardware configuration of the image pickup apparatus 100 according to the first exemplary embodiment. The image pickup apparatus 100 includes an operation unit 102, a display unit 104, an information processing apparatus 110, and a capture unit 130. Note that the operation unit 102 and the display unit 104 may not be provided in the image pickup apparatus 100. The operation unit 102 is, for example, a touch panel, a keyboard or the like. The operation unit 102 accepts operations by the user who is a videographer or the like. The operation unit 102 may display information necessary for the user according to control by the information processing apparatus 110.

The display unit 104 is, for example, a touch panel, an LCD (Liquid Crystal Display) or the like. The display unit 104 displays information necessary for the user according to control by the information processing apparatus 110. The display unit 104 may include an input apparatus and accept operations by the user as necessary. The display unit 104 may display the video or still images that are captured by the capture unit 130.

The information processing apparatus 110 is, for example, a computer. The information processing apparatus 110 includes a control unit 112 that is, for example, a CPU (Central Processing Unit) or the like, a memory unit 114 that is, for example, a memory, a hard disk or the like, and a communication unit 116. The information processing apparatus 110 controls operations by the operation unit 102, the display unit 104, and the capture unit 130. The information processing apparatus 110 performs necessary processes in response to operations that have been accepted by the operation unit 102. Further, the information processing apparatus 110 performs necessary processes such as image processing including an extraction of the still images on the video captured by the capture unit 130. The communication unit 116 performs necessary processes for communicating with the information processing terminal 200 that is connected wirelessly or wired.

The capture unit 130 is an image pickup element such as a CCD (Charge Coupled Device) image sensor, a CMOS (Complementary Metal Oxide Semiconductor) image sensor or the like. The capture unit 130 performs a process of reading a scene in front of the capture unit 130 as the moving image. Specifically, the capture unit 130 captures the video and generates the moving image data corresponding to the captured video. Alternatively, the capture unit 130 may capture a still image and generate still image data corresponding to the captured still image. Note that in addition to the original meaning indicated by the term "video", the term "video" also means "moving image data indicating a video" which will be processed in terms of information processing. Likewise, in addition to the original meaning indicated by the term "still image", the term "still image" means "still image data indicating a still image" which will be processed in terms of information processing.

Figure 3:
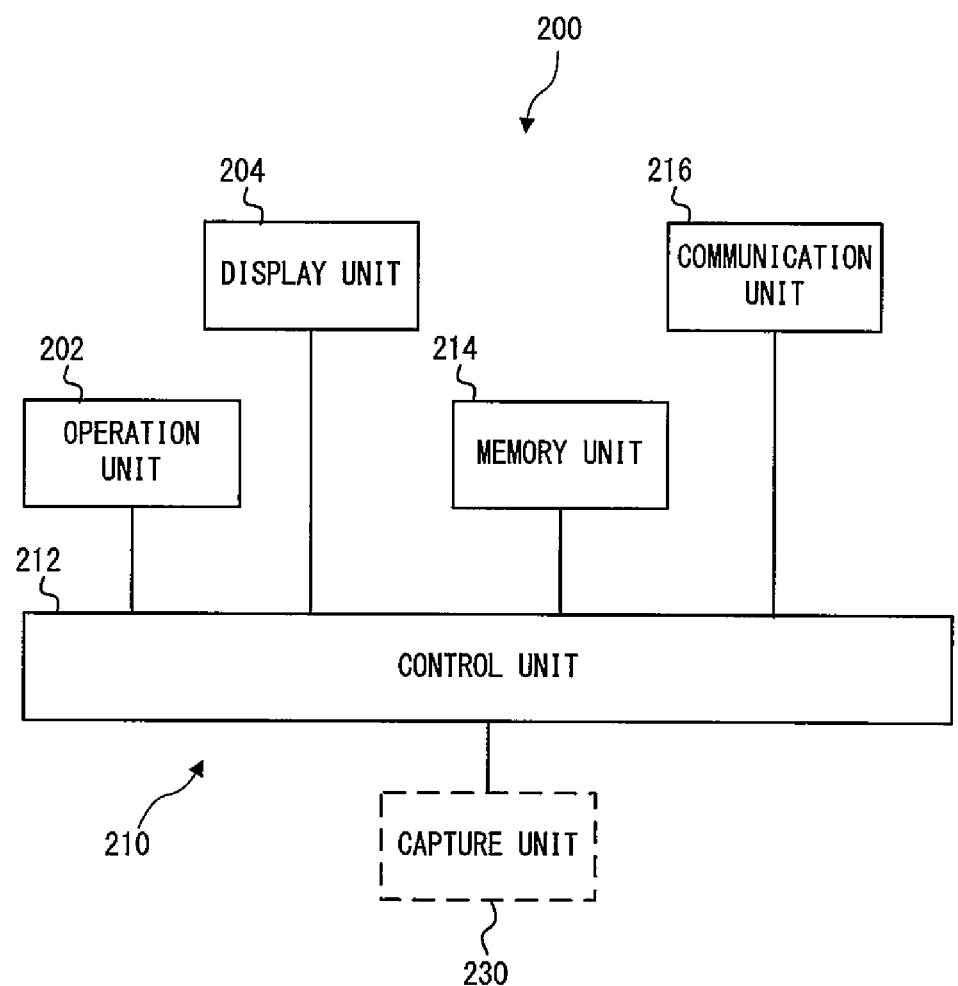
FIG. 3 is a drawing showing a hardware configuration of an information processing terminal according to the first exemplary embodiment.

FIG. 3 is a drawing showing a hardware configuration of the information processing terminal 200 according to the first exemplary embodiment. The information processing terminal 200 includes an operation unit 202, a display unit 204, an information processing apparatus 210, and a capture unit 230. Note that the capture unit 230 may not be provided in the information processing terminal 200.

The operation unit 202 is, for example, a touch panel, a keyboard or the like. The operation unit 202 accepts user operations. The operation unit 202 may display information necessary for the user according to control by the information processing apparatus 210. The display unit 204 is, for example, a touch panel, an LCD or the like. The display unit 204 displays information necessary for the user according to control by the information processing apparatus 210. The display unit 204 further displays the video or still images that are obtained from the image pickup apparatus 100. The display unit 204 may include an input apparatus and accept operations by the user as necessary. Note that preferably the operation unit 202 and the display unit 204 constitute a touch panel in an integrated manner.

The information processing apparatus 210 is, for example, a computer. The information processing apparatus 210 includes a control unit 212 that is, for example, a CPU or the like, a memory unit 214 that is, for example, a memory, a hard disk or the like, and a communication unit 216. The information processing apparatus 210 controls operations by the operation unit 202, the display unit 204, and the capture unit 230. The information processing apparatus 210 performs necessary processes in response to operations that have been accepted by the operation unit 202. Further, the information processing apparatus 210 performs necessary processes such as a process for displaying the still images or a video obtained from the image pickup apparatus 100. The communication unit 216 performs necessary processes for communicating with the image pickup apparatus 100 that is connected wirelessly or wired. The capture unit 230 has the same configuration as that of the capture unit 130 provided in the image pickup apparatus 100.

Figure 4:
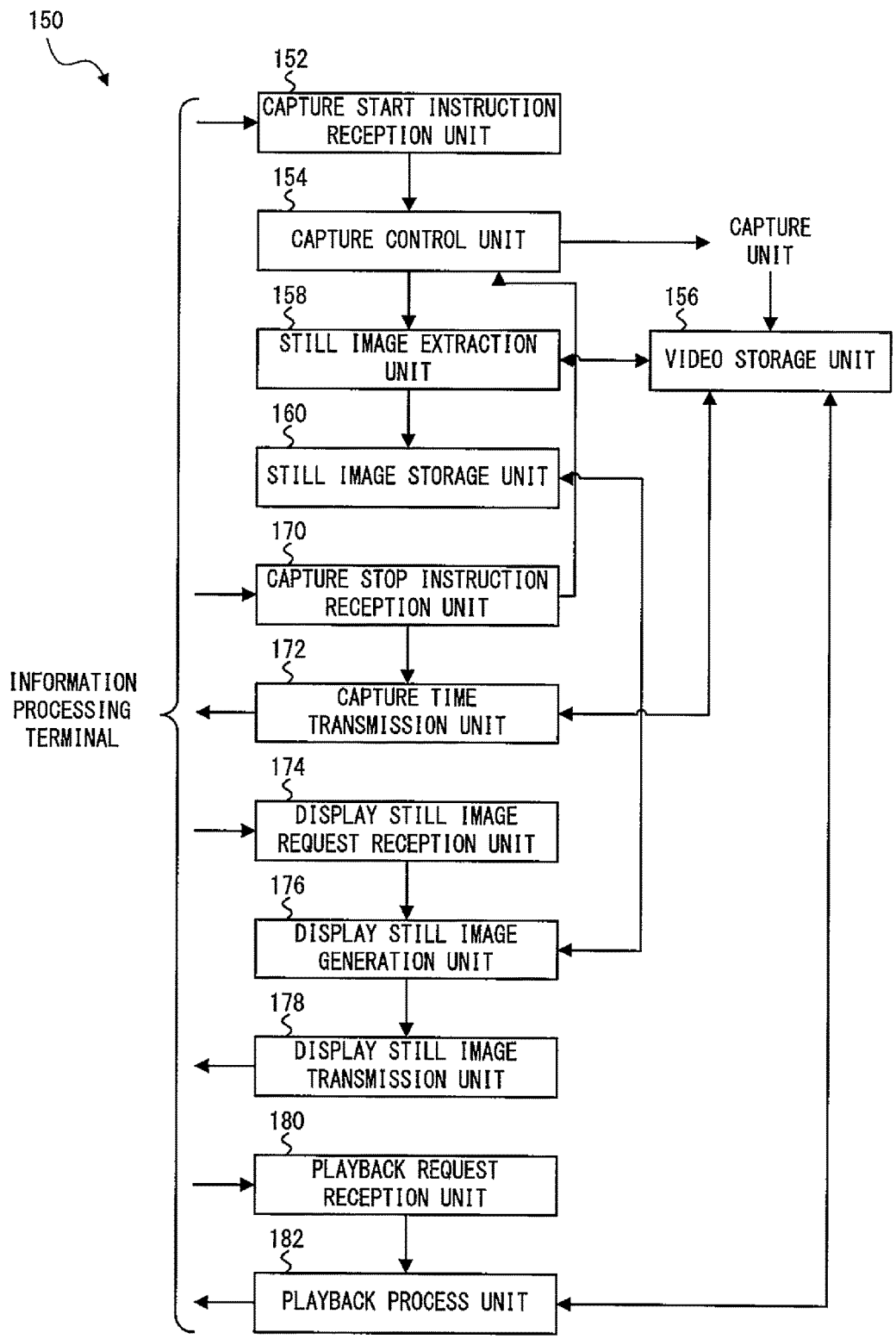
FIG. 4 is a functional block diagram of the image pickup apparatus according to the first exemplary embodiment.

FIG. 4 is a functional block diagram showing the image pickup apparatus 100 according to the first exemplary embodiment. The image pickup apparatus 100 according to the first exemplary embodiment includes a capture process unit 150. The capture process unit 150 includes a capture start instruction reception unit 152, a capture control unit 154, a video storage unit 156, a still image extraction unit 158, and a still image storage unit 160. The capture process unit 150 includes a capture stop instruction reception unit 170, a capture time transmission unit 172, a display still image request reception unit 174, a display still image generation unit 176, and a display still image transmission unit 178. The capture process unit 150 further includes a playback request reception unit 180 and a playback process unit 182. Although the components of the capture process unit 150 shall be explained later in more detail, only some of the components shall be explained as follows.

The still image extraction unit 158 extracts a plurality of still images of scenes respectively corresponding to predetermined time sections of a video from the video captured by the capture unit 130. When the predetermined time section is, for example, five seconds, the still image extraction unit 158 extracts still images of scenes respectively corresponding to sections at five-second intervals from a start of the video. More specifically, the still image extraction unit 158 extracts the still image of the scene at zero second from the start of the video, the still image of the scene at five seconds from the start of the video, and the still image of the scene at ten seconds from the start of the video. Thereafter, the still image extraction unit 158 extracts the still images at five-second intervals in a manner similar to that of the operation described above. The still image extraction unit 158 performs the above-described extraction process until the end of the video.

The still image extraction unit 158 adds time information, which is information relating to time corresponding to each still image, to each of the extracted still images. Thus, the still image which is treated as being the still image data includes the time information. More specifically, the still image extraction unit 158 adds the time information indicating, for example, "zero second from the start of the video" to the still image of the scene at zero second from the start of the video. Likewise, the still image extraction unit 158 adds the time information indicating "five seconds from the start of the video" to the still image of the scene at five seconds from the start of the video. Note that when the time in which the video has been captured is added to the video, the time information may indicate the time when the scene of the still image is captured.

In response to a request from the information processing terminal 200, the display still image generation unit 176 acquires a plurality of display still images respectively corresponding to at least some of the extracted still images. The information processing terminal 200 displays a list of the plurality of display still images. Accordingly, the display still image generation unit 176 performs image processing such as a compression process and a reduction process on the original still image so as to generate a display still image such as the thumbnail or the like. Note that the time information that has been added to the original still image is added to this display still image. In other words, the display still image also includes the time information.

Note that the capture process unit 150 can be achieved by, for example, the control unit 112 performing control so that a program is executed. More specifically, the image processing unit 150 is realized by the control unit 112 performing control so as to execute the program stored in the memory unit 114. The components of the capture process unit 150 may not only be realized by software comprised of programs but also realized by a combination of hardware, firmware, and software. Further, the components of the capture process unit 150 may be realized by an integrated circuit that can be programmed by a user such as FPGA (field-programmable gate array), a microcomputer or the like. In such a case, a program comprised of the above-mentioned components may be realized using this integrated circuit. The same applies to a video checking process unit 250 in the information processing terminal 200 which will be explained later.

Figure 5:
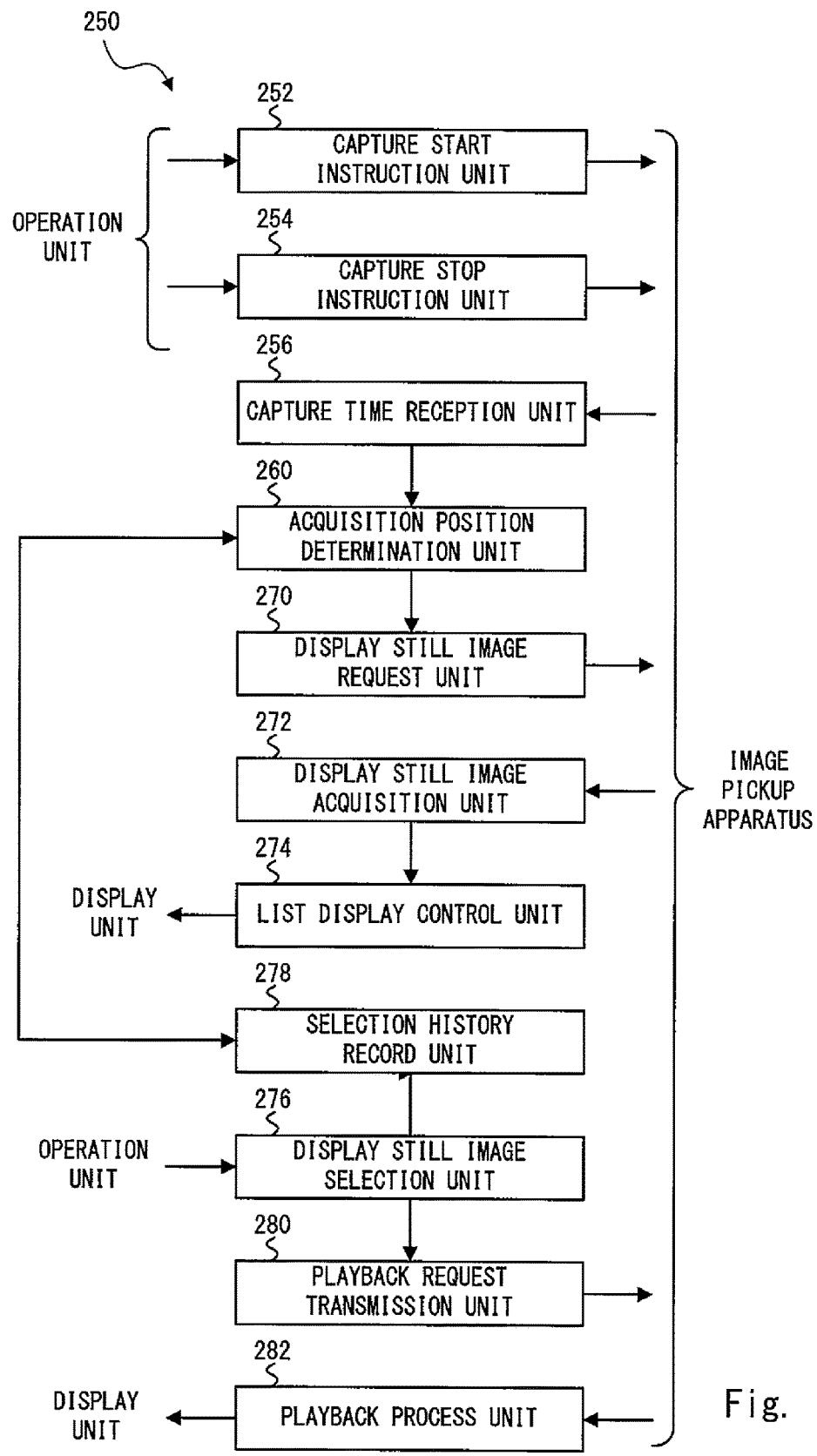
FIG. 5 is a functional block diagram of the information processing terminal according to the first exemplary embodiment.

FIG. 5 is a functional block diagram of the information processing terminal 200 according to the first exemplary embodiment. The information processing terminal 200 according to the first exemplary embodiment includes the video checking process unit 250. The video checking process unit 250 includes a capture start instruction unit 252 and a capture stop instruction unit 254. The video checking process unit 250 further includes a capture time reception unit 256, an acquisition position determination unit 260, a display still image request unit 270, a display still image acquisition unit 272, and a list display control unit 274. The video checking process unit 250 further includes a still image selection unit 276, a selection history record unit 278, a playback request transmission unit 280, and a playback process unit 282. The video checking process unit 250 performs processes for the user to check the video that has been captured by the image pickup apparatus 100. In other words, the video checking process unit 250 executes a method for the user to check the video. Although the components of the video checking processing unit 250 shall be explained later in more detail, some of the components shall be explained as follows.

The display still image selection unit 276 selects, by a user operation, one or more display still images from the list of the plurality of display still images that are displayed on the display unit 204. The selection history record unit 278 records a history of the selection based on the time information that has been added to the display still image(s) selected by the display still image selection unit 276. More specifically, the selection history record unit 278 records a time backward from the end of the video until a time position indicated by the time information relating to the selected display still image. Note that the "time position" indicates a position on a time axis of the video and is a time from, for example, the start of the video. For example, when a capture time of the video is "five minutes" and the time information relating to the selected display still image indicates "two minutes from the start of the video", a time backward from the end of the video until the time position indicated by the time information relating to the selected display still image is; 5 minutes−2 minutes=3 minutes. Accordingly, in this case, the selection history record unit 278 records the time information indicating "three minutes until the end of the video" as a selection history. This time information shall be referred to as "selection time information".

Figure 6:
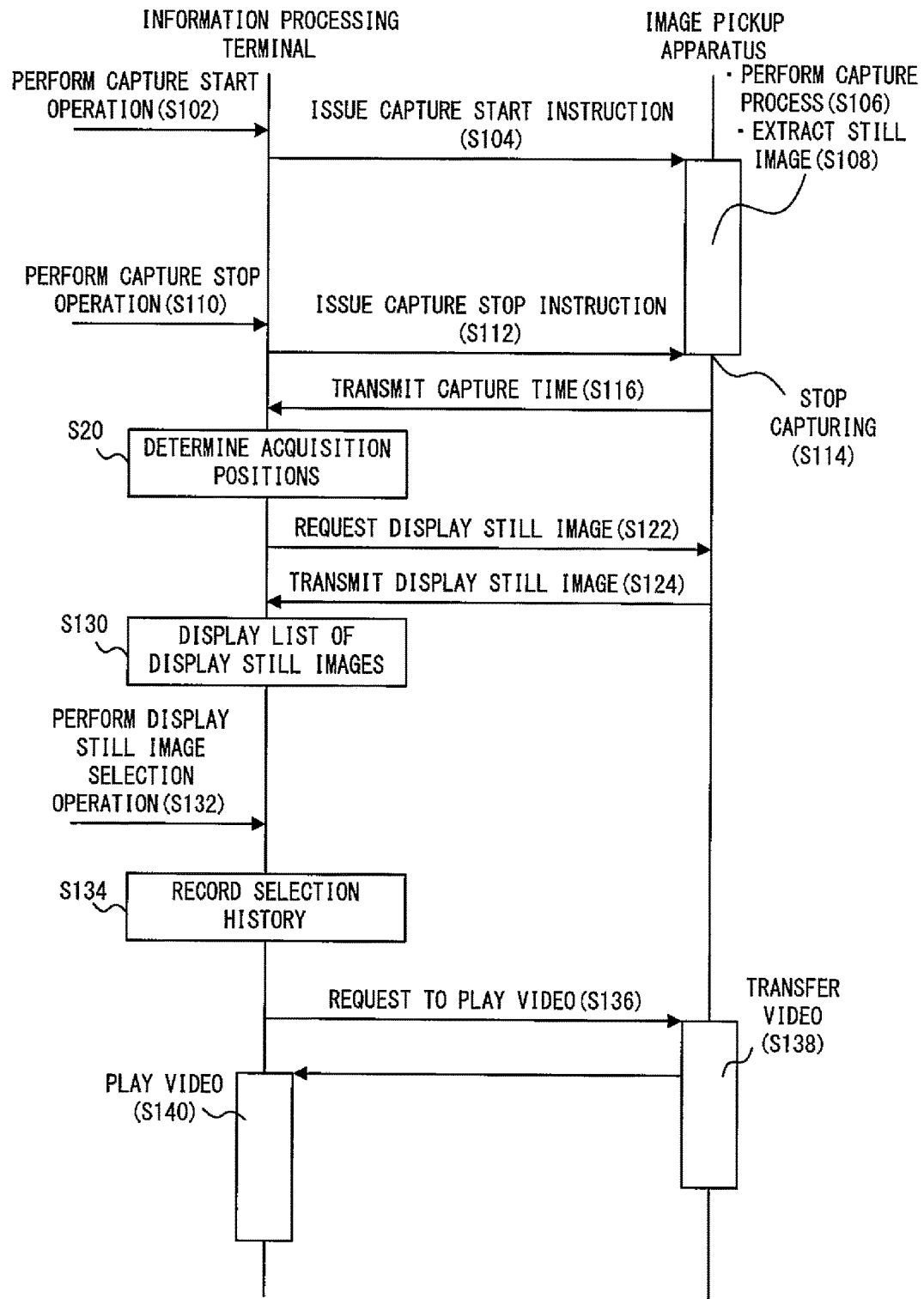
FIG. 6 is a sequence diagram showing a flow of processes by a video capture system according to the first exemplary embodiment.

FIG. 6 is a sequence diagram showing a flow of processes carried out by the video capture system 1 according to the first exemplary embodiment. Firstly, in the step S102, the operation unit 202 of the information processing terminal 200 accepts an operation relating to a start of capturing a video which has been performed by a user. To be more specific, when, for example, the display unit 204 displays an icon of an instruction to start capturing the video, and the user touches the icon, the operation unit 202 accepts the operation relating to the start of capturing the video.

In response to this operation, in the step S104, the information processing terminal 200 instructs the image pickup apparatus 100 to start capturing the video. More specifically, the capture start instruction unit 252 receives a signal indicating an operation relating to the start of capturing the video from the operation unit 202. In response to this signal, the capture start instruction unit 252 generates a signal indicating instruction to start capturing the video and transmits the generated signal to the image pickup apparatus 100 via the communication unit 216 and the communication path 10.

When the image pickup apparatus 100 receives the signal indicating the instruction to start capturing the video from the information processing terminal 200, the image pickup apparatus 100 performs a capture process in the step S106. The image pickup apparatus 100 further performs the process of extracting the still images in the step S108. More specifically, the capture start instruction reception unit 152 receives the signal indicating the instruction to start capturing the video from the information processing terminal 200 via the communication path 10 and the communication unit 116. At this time, the capture start instruction reception unit 152 outputs the signal indicating the instruction to start capturing the video to the capture control unit 154. The capture control unit 154 controls the capture unit 130 to capture the video. The video storage unit 156 stores the video as the moving image data that has been generated by the capture unit 130.

While the capture control unit 154 controls the capture unit 130 to capture the video, the capture control unit 154 outputs an instruction to extract the still images from the video at predetermined time intervals to the still image extraction unit 158. The still image extraction unit 158 extracts the still images at the predetermined time intervals from the video that has been stored in the video storage unit 156. To be more specific, as described above, the still image extraction unit 158 extracts the plurality of still images of the scenes respectively corresponding to predetermined time sections. Note that the "predetermined time intervals" may be specified by the information processing terminal 200. In such a case, the signal indicating the instruction to start capturing the video that is transmitted from the information processing terminal 200 may include information indicating the time intervals. The still image extraction unit 158 stores the plurality of extracted still images in the still image storage unit 160. At this time, the still image extraction unit 158 adds corresponding time information to each of the still images.

Next, in the step S110, the operation unit 202 of the information processing terminal 200 accepts an operation relating to a stop of capturing the video which has been performed by the user. More specifically, when, for example, the display unit 204 displays an icon of an instruction to stop capturing the video, and the user touches the icon, the operation unit 202 accepts the operation relating to the stop of capturing the video.

In response to this operation, in the step S112, the information processing terminal 200 instructs the image pickup apparatus 100 to stop capturing the video. To be more specific, the capture stop instruction unit 254 receives a signal indicating an operation relating to the stop of capturing the video from the operation unit 202. In response to this signal, the capture stop instruction unit 254 generates a signal indicating the instruction to stop capturing the video and transmits the generated signal to the image pickup apparatus 100 via the communication unit 216 and the communication path 10.

In the step S114, when the image pickup apparatus 100 receives the signal indicating the instruction to stop capturing the video from the information processing terminal 200, the image pickup apparatus 100 stops the capture process. More specifically, the capture stop instruction reception unit 170 receives the signal indicating the instruction to stop capturing the video from the information processing terminal 200 via the communication path 10 and the communication unit 116. At this time, the capture stop instruction reception unit 170 outputs the signal indicating the instruction to stop capturing the video to the capture control unit 154 and the capture time transmission unit 172. In response, the capture control unit 154 controls the capture unit 130 to stop capturing the video.

At this time, in the step S116, the image pickup apparatus 100 transmits the information indicating the capture time of the video that has been captured to the information processing terminal 200. To be more specific, when the capture time transmission unit 172 accepts the signal from the capture stop instruction reception unit 170, the capture time transmission unit 172 acquires the information indicating the capture time of the video that has been stored in the video storage unit 156. Next, the capture time transmission unit 172 transmits the acquired information indicating the capture time to the information processing terminal 200 via the communication unit 116 and the communication path 10. The capture time reception unit 256 of the information processing terminal 200 receives the information indicating the capture time via the communication path 10 and the communication unit 216.

When the information processing terminal 200 receives the information indicating the capture time, in the step S20, the information processing terminal 200 determines positions in the video respectively corresponding to the display still images which should be acquired in order to display them in the subsequent process. To be more specific, the capture time reception unit 256 transmits the information indicating the capture time to the acquisition position determination unit 260. The acquisition position determination unit 260 determines the positions in the video for the display still images which should be acquired using the information indicating the capture time and the selection history that has been recorded in the selection history record unit 278. The details of the above process shall be explained as follows.

Figure 7:
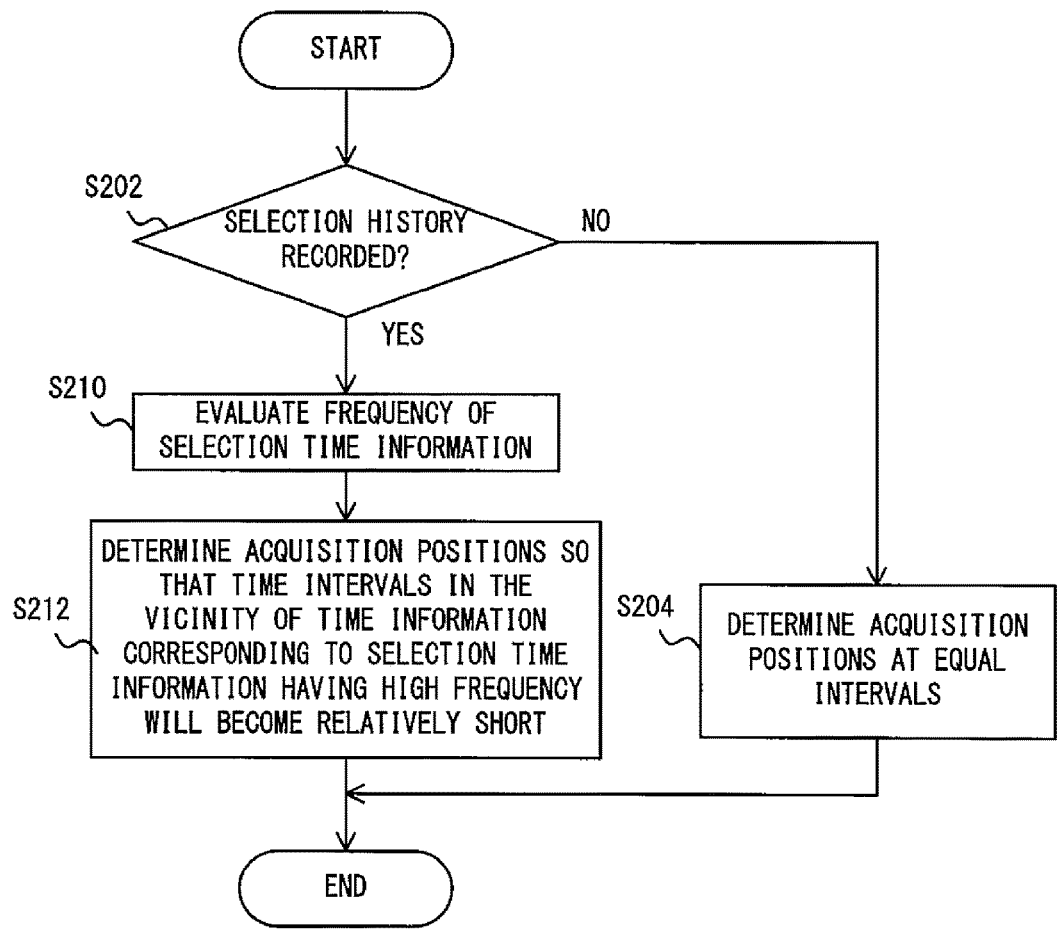
FIG. 7 is a flowchart showing processes by an acquisition position determination unit according to the first exemplary embodiment.

FIG. 7 is a flowchart showing processes carried out by the acquisition position determination unit 260 according to the first exemplary embodiment. Firstly, in the step S202, the acquisition position determination unit 260 evaluates as to whether or not the selection history has been recorded in the selection history record unit 278. When the selection history has not been recorded, which is NO in the evaluation of S202, in the step S204, the acquisition position determination unit 260 determines acquisition positions in such a way that the positions of the display still images which should be acquired on the time axis will be at equal intervals. Note that the "acquisition position" is the time position of the display still image which should be acquired in the video to be processed, i.e., a position on the time axis of the video.

In the first exemplary embodiment, the time intervals of the display still images which should be acquired are determined to be longer than the time intervals of the still images that have been stored in the still image storage unit 160. By doing so, the number of the display still images which are acquired will be smaller than that of the still images that have been extracted by the still image extraction unit 158. When the still images have been stored in the still image storage unit 160 at, for example, five-second intervals, the acquisition position determination unit 260 determines the acquisition positions at 20-second intervals that are longer than five-second intervals. More specifically, the acquisition position determination unit 260 determines the acquisition positions as in "zero second from the start of the video", "20 seconds from the start of the video", "40 seconds from the start of the video", and "60 seconds from the start of the video".

On the other hand, when the selection history has been recorded, which is YES in the evaluation of S202, in the step S210, the acquisition position determination unit 260 evaluates a frequency of the selection time information. When one piece of the selection time information indicating "three minutes until the end of the video" has been recorded in the selection history record unit 278, that is, when the display still image indicating "three minutes until the end of the video" is selected once, the frequency of the selection time information indicating "three minutes until the end of the video" is "one". Likewise, when, for example, two pieces of the selection time information indicating "two minutes until the end of the video" are recorded in the selection history record unit 278, that is, when the display still image indicating "two minutes until the end of the video" is selected twice, the frequency of the selection time information indicating "two minutes until the end of the video" is "two".

In the step S212, the acquisition position determination unit 260 determines the acquisition positions in such a way that, in the video to be processed, the time intervals at the time position corresponding to the selection time information having a high frequency will become relatively short. In other words, the acquisition position determination unit 260 determines the acquisition positions in such a way that the time intervals in the period of time in which the frequency of the selection is high will become shorter than the time intervals in a period of time in which the frequency of the selection is low.

Assume that the selection history record unit 278 records one piece of the selection time information indicating "three minutes until the end of the video" as the selection time information. When the capture time of the video to be processed is five minutes, the time information corresponding to the selection time information indicating "three minutes until the end of the video" is the information indicating "two minutes from the start of the video". In this case, the display still image corresponding to the selection time information having the high frequency is the display still image corresponding to the time information indicating "two minutes from the start of the video". Accordingly, the acquisition position determination unit 260 determines the acquisition positions in such a way that the time intervals in the period of time in the vicinity of the time information indicating "two minutes from the start of the video" will become shorter than the time intervals in other periods of time.

That is, the acquisition position determination unit 260 determines the acquisition positions so as to acquire the display still images at, for example, ten-second intervals in the period of time in the vicinity of "two minutes from the start of the video. On the other hand, the acquisition position determination unit 260 determines the acquisition positions in such a way that the time intervals in other periods of time such as the period of time of "four minutes from the start of the video" will become longer than ten-second intervals such as 30-second intervals or the like. Note that the acquisition position determination unit 260 may determine the acquisition positions in such a way that the time intervals will not be changed and will be 20-second intervals in other periods of time.

Further, assume that the selection history record unit 278 records one piece of the selection time information indicating "three minutes until the end of the video" as the selection time information and two pieces of the selection time information indicating "two minutes until the end of the video" as the selection time information. In this case, the frequency of the selection time information indicating "two minutes until the end of the video" is higher than that of the selection time information indicating "three minutes until the end of the video". When the capture time of the video to be processed is five minutes, the time information corresponding to the selection time information indicating "three minutes until the end of the video" is the information indicating "two minutes from the start of the video". Likewise, the time information corresponding to the selection time information indicating "two minutes until the end of the video" is the information indicating "three minutes from the start of the video". In this case, the display still image corresponding to the selection time information having the highest frequency is the display still image corresponding to the time information indicating "three minutes from the start of the video". Further, the display still image corresponding to the selection time information having the second highest frequency is the display still image corresponding to the time information indicating "two minutes from the start of the video".

Accordingly, the acquisition position determination unit 260 determines the acquisition positions in such a way that the time intervals in the period of time in the vicinity of the time information indicating "three minutes from the start of the video" will become shorter than the time intervals in the period of time in the vicinity of the time information indicating "two minutes from the start of the video". Likewise, the acquisition position determination unit 260 determines the acquisition positions in such a way that the time intervals in the period of time in the vicinity of the time information indicating "two minutes from the start of the video" will become shorter than the time intervals in the periods of time in the vicinity of other time information.

That is, the acquisition position determination unit 260 determines the acquisition positions so as to acquire the display still images at, for example, five-second intervals in the period of time in the vicinity of "three minutes from the start of the video. Further, the acquisition position determination unit 260 determines the acquisition position in such a way that the display still images are acquired at intervals longer than the five-second intervals, for example, ten-second intervals or the like. Moreover, the acquisition position determination unit 260 determines the acquisition positions in such a way that the time intervals will become longer than the ten-second intervals such as 30-second intervals or the like in other periods of time such as the period of time of "four minutes from the start of the video".

The acquisition position determination unit 260 outputs the information indicating the determined acquisition positions, i.e. the time information, to the display still image request unit 270. Note that a specific example of the process by the acquisition position determination unit 260 shall be explained later in detail.

In the step S122, the information processing terminal 200 requests the display still images to the image pickup apparatus 100. To be more specific, the display still image request unit 270 transmits an instruction to request the display still images to the image pickup apparatus 100 via the communication unit 216 and the communication path 10. The instruction to request the display still images includes the information indicating the acquisition positions that have been determined by the acquisition position determination unit 260. Next, the display still image request reception unit 174 of the image pickup apparatus 100 receives the instruction to request the display still images via the communication path 10 and the communication unit 116. Next, the display still image request reception unit 174 outputs the information indicating the acquisition positions which is included in the instruction to request the display still images to the display still image generation unit 176.

In the step S124, the image pickup apparatus 100 transmits the display still images to the information processing terminal 200. More specifically, the display still image generation unit 176 acquires, from the still image storage unit 160, the still images corresponding to the time information that indicates the acquisition positions transmitted from the information processing terminal 200. Next, the display still image generation unit 176 performs the above-mentioned image processing on the acquired still images and generates the display still images. In this manner, the display still images corresponding to the acquisition positions are generated. The display still image generation unit 176 outputs the generated display still images to the display still image transmission unit 178.

The display still image transmission unit 178 transmits the display still images to the information processing terminal 200 via the communication unit 116 and the communication path 10. The display still image acquisition unit 272 of the information processing terminal 200 receives the display still images from the image pickup apparatus 100 via the communication path 10 and the communication unit 216. In this way, the display still image acquisition unit 272 acquires the display still images corresponding to the acquisition positions that have been determined by the acquisition position determination unit 260. The display still image acquisition unit 272 outputs the acquired display still images to the list display control unit 274.

In the step S130, the information processing terminal 200 displays the list of the display still images that have been received from the image pickup apparatus 100. More specifically, the list display control unit 274 controls the display unit 204 to display the list of the display still images that have been transmitted from the display still image acquisition unit 272. By doing so, the display unit 204 displays the list of the plurality of display still images.

Note that the method for the list display control unit 274 to control the display unit 204 to display the plurality of display still images can be changed as appropriate according to the size of the display unit 204 and user preferences. The list display control unit 274 may control the display unit 204 to display the plurality of display still images, for example, arranged in a line or separate the line into a plurality of lines as appropriate. When the positions of the display still images on the time axis of the video are not at equal intervals, the list display control unit 274 may control the display unit 204 to increase or reduce the intervals to correspond to the positions on the time axis or may control the display unit 204 to arrange the display still images at equal intervals.

When there are a number of the display still images and all of the display still images cannot be displayed on the display unit 204, the list display control unit 274 may control the display unit 204 to preferentially display the display still images relating to the time corresponding to the selection time information having the high frequency. In such a case, the list display control unit 274 may control the display unit 204 so that it does not display the rest of the display still images as appropriate. In this case, the display still images that have not been displayed may be displayed by a scroll operation by the user.

In the step S132, the operation unit 202 of the information processing terminal 200 accepts an operation by the user relating to the selection of the display still images. To be more specific, when the plurality of display still images are displayed on the display unit 204, and the user touches the display still image that has been displayed to select it, the operation unit 202 accepts the operation relating to the selection of the display still image. In response to this operation, the display still image selection unit 276 accepts the information indicating the display still image that has been touched and selected. In this manner, the display still image selection unit 276 selects one or more display still images from the plurality of display still images that are displayed in a list on the display unit 204. The display still image selection unit 276 outputs the information indicating the selected display still image to the selection history record unit 278 and the playback request transmission unit 280.

In the step S134, the information processing terminal 200 records the selection history. More specifically, as described above, the selection history record unit 278 records the selection history, i.e. the selection time information, based on the time information that has been added to the display still image selected by the display still image selection unit 276. The process of the step S134 may be performed after the step S136. When one display still image is selected in the process of S132, the selection history record unit 278 records the selection time information corresponding to the selected display still image.

In the step S136, the information processing terminal 200 requests the image pickup apparatus 100 to play the video. To be more specific, the playback request transmission unit 280 transmits an instruction to request the playing of the video to the image pickup apparatus 100 via the communication unit 216 and the communication path 10. The instruction to request the playing of the video includes the time information corresponding to the selected display still image. The playback request reception unit 180 receives the instruction to request the playing of the video via the communication path 10 and the communication unit 116. The playback request reception unit 180 outputs the time information corresponding to the selected display still image which is included in the received instruction to the playback process unit 182.

In the step S138, the image pickup apparatus 100 transfers the video to the information processing terminal 200. To be more specific, the playback process unit 182 performs a process to cause the information processing terminal 200 to play the video from the time indicated by the time information corresponding to the selected display still image. The playback process unit 182 performs a streaming distribution process on the information process terminal 200 so that the video is played from the time corresponding to the selected display still image.

In the step S140, the information processing terminal 200 plays the video that has been transferred from the image pickup apparatus 100. More specifically, the playback process unit 282 performs a process to display, on the display unit 204, the video which has been distributed through streaming by the image pickup apparatus 100. This enables the display unit 204 to play the video from the time corresponding to the selected display still image. Note that the method of transferring the video is not limited to the streaming distribution. The image pickup apparatus 100 may perform the process to play the video from the time corresponding to the selected display still image and then transmit the moving image data itself to the information processing terminal 200. In this case, the information processing terminal 200 may download the moving image data.

Note that in the process of S132, two display still images may be selected. In other words, a period for which the video will be played may be specified instead of specifying a point to start playing the video. In this case, the playback process unit 182 and the playback process unit 282 may start the video from the time corresponding to the earlier time between the two selected display still images and stop playing the video at the time corresponding to the later time between the two selected display still images. In this case, the selection history record unit 278 may record the time information corresponding to each of the start and stop times and the time information of the entire periods from the start and end times, as the selection time information. Further, in this case, the acquisition position determination unit 260 may determine the acquisition positions for the time information corresponding to the period in such a way that the time intervals will become relatively short.

In the above-described exemplary embodiment, the user uses the information processing terminal 200 in the operation of S110 to give the instruction to stop capturing the video, and then without any operation by the user, the display still images are displayed on the information processing terminal 200 in the process of S130. Therefore, after the user gives the instruction to stop capturing the video, the user can check the contents of the video in a short time without a troublesome operation. This enables the user to find a scene which the user desires to view in a short time. The same applies to other embodiments.

Moreover, in the above-described exemplary embodiment, the display still images are displayed at relatively short intervals (i.e., finely) in the period of time in which the frequency of the selection is high. The scenes which a user desires to view tend to be concentrated on periods of time that are close to each other. A user often stops a video immediately after a scene which the user desires to view, for example, after about ten seconds. Another user often stops the video after a while, for example, after about two minutes, when the user views a desired scene. Thus, the display still images are displayed at short intervals in the period of time in which the frequency of the selection is high according to the selection history. This enables the user to easily find the scene which the user desires to view. The same applies to other exemplary embodiments.

In the first exemplary embodiment, when there is no selection history, comparatively few display still images are displayed. Accordingly, even when the size of the display unit 204 is small, the plurality of display still images can be displayed in a list.

Hereinafter, specific examples of the first exemplary embodiment shall be explained by referring to the drawings.

Figure 8:
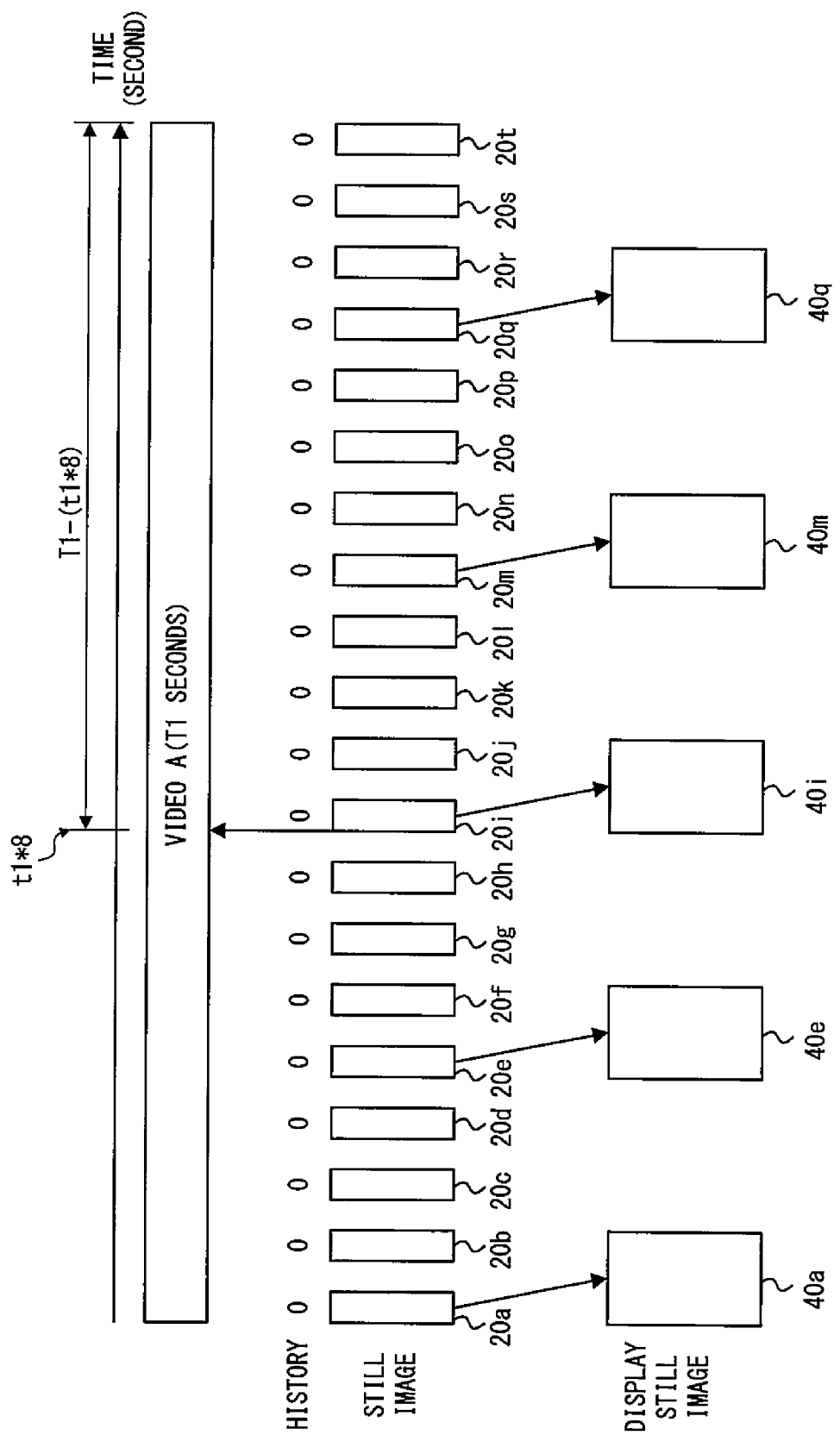
FIG. 8 is a drawing showing a first specific example for explaining processes according to the first exemplary embodiment.
Figure 9:
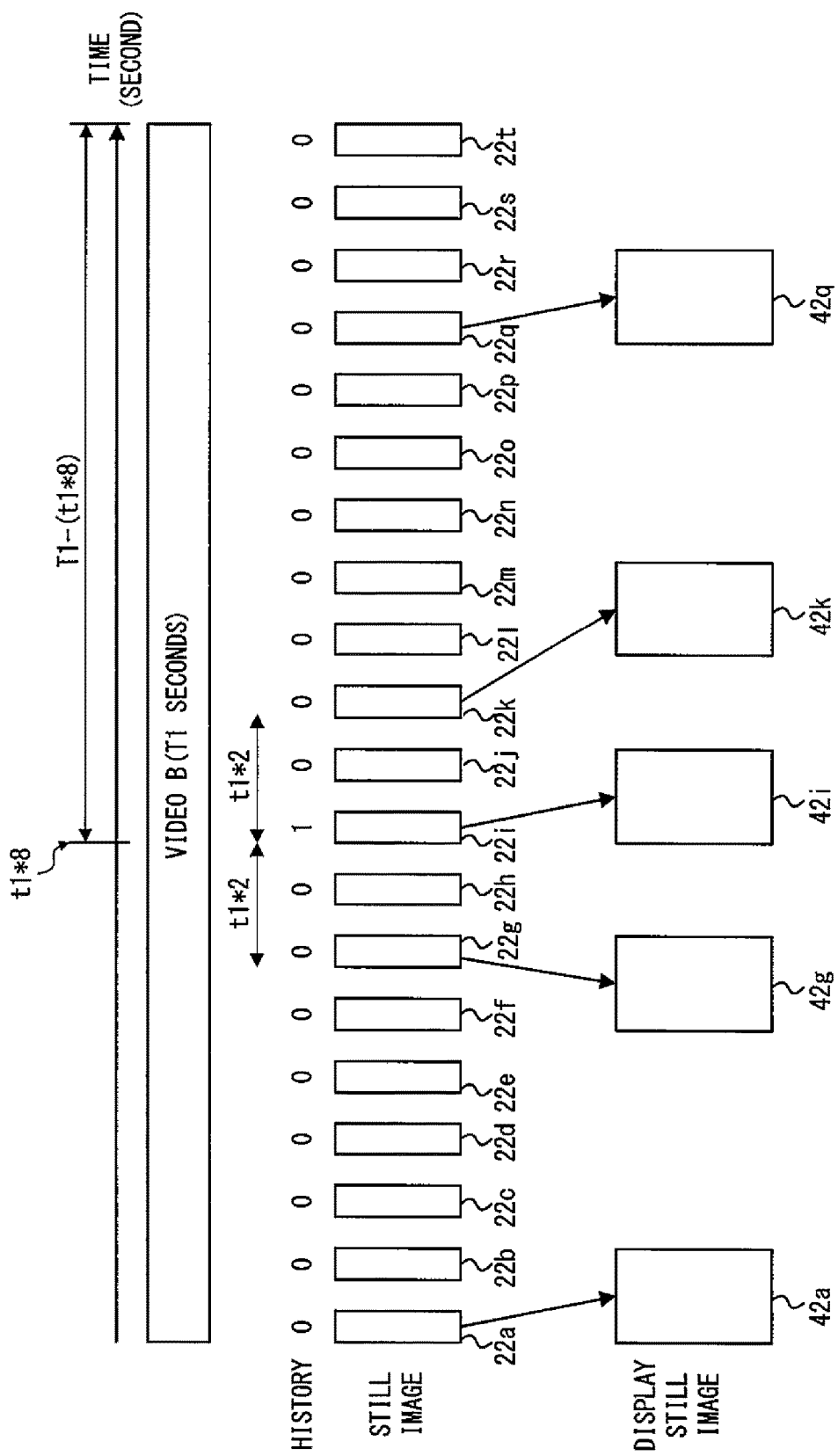
FIG. 9 is a drawing showing the first specific example for explaining the processes according to the first exemplary embodiment.

FIGS. 8 and 9 are drawings showing a first specific example for explaining the processes according to the first exemplary embodiment. In the first exemplary embodiment, the start point to play the video is specified. As shown in FIG. 8, the image pickup apparatus 100 captures a video A and extracts still images 20*a* to 20*t* relating to the video A. At this time, in the information processing terminal 200, assume that the selection history record unit 278 has not recorded the selection history. Additionally, the time intervals of the still images 20*a* to 20*t* shall be t1 seconds.

At this time, as the selection history record unit 278 has not recorded the selection history, in the process of S204 shown in FIG. 7, the acquisition position determination unit 260 determines the acquisition positions at equal intervals. When the intervals of the acquisition positions are, for example, t2=t1*4 (seconds), the acquisition position determination unit 260 determines the acquisition positions as in, "zero second from the start of the video", "t1*4 (seconds) from the start of the video", "t1*8 (seconds) from the start of the video", "t1*12 (seconds) from the start of the video", and "t1*16 (seconds) from the start of the video".

The display still image generation unit 176 acquires the still image 20*a* corresponding to the acquisition position of "zero second from the start of the video". Further, the display still image generation unit 176 acquires the still image 20*e* corresponding to the acquisition position of "(t1*4) seconds from the start of the video". Likewise, the display still image generation unit 176 acquires the still images 20*i*, 20*m*, and 20*q* respectively corresponding to the acquisition positions of "(t1*8) seconds from the start of the video", "(t1*12) seconds from the start of the video", and "(t1*16) seconds from the start of the video". After this, the display still image generation unit 176 performs the image processing on the still images 20*a*, 20*e*, 20*i*, 20*m*, and 20*q* and generates display still images 40*a*, 40*e*, 40*i*, 40*m*, and 40*q*.

Next, the display still image acquisition unit 272 acquires the display still images 40*a*, 40*e*, 40*i*, 40*m*, and 40*q* from the image pickup apparatus 100. Then, the information processing terminal 200 displays a list of these display still images 40a, 40e, 40i, 40m, and 40q on the display unit 204. When the user selects the display still image 40i, by the process of the image pickup apparatus 100, the information processing terminal 200 plays the video from the time position corresponding to the display still image 40i, i.e. the time information corresponding to the still image 20i. When the capture time of the video is T1 seconds, the selection history record unit 278 records the selection time information indicating "T1−(t1*8)" (seconds).

Next, as shown in FIG. 9, the image pickup apparatus 100 captures a video B and extracts still images 22a to 22t relating to the video B. At this time, in the information processing terminal 200, the selection history record unit 278 has recorded the selection time information indicating "T1−(t1*8)" (seconds). Additionally, the time intervals of the still images 22a to 22t shall be t1 seconds. Moreover, the capture time of the video B shall be T1 seconds.

As the selection history record unit 278 has recorded the selection history, in the process of S210 shown in FIG. 7, the acquisition position determination unit 260 evaluates the frequency of the selection time information. In this case, the acquisition position determination unit 260 evaluates the frequency of the selection time information indicating "T1−(t1*8)" (seconds) as being "one". The time position in the video B corresponding to the selection time information indicating "T1−(t1*8)" (seconds) is T1−(T1−(t1*8))=t1*8 seconds.

Accordingly, the acquisition position determination unit 260 determines the acquisition positions in such a way that the time intervals in the vicinity of the time position t1*8 (seconds) will become relatively short. In this example, the acquisition position determination unit 260 determines the time intervals in the vicinity of the time information "t1*8 (seconds) from the start of the video" as being t1*2 (seconds) and the intervals of a rest of time information as being longer than t1*2 (seconds), for example, t1*6 (seconds) or the like. The time intervals of the rest of the time information should only be longer than the time intervals in the period of time in the vicinity of the time information corresponding to the selection time information having the high frequency, and may not be necessarily constant. The same applies to other specific examples.

In this case, the acquisition position determination unit 260 determines the time information "t1*8 (seconds) from the start of the video" as being the acquisition position. The acquisition position determination unit 260 further determines two pieces of the time information "t1*6 (seconds) from the start of the video" and "t1*10 (seconds) from the start of the video", which are in the vicinity of the time information "t1*8 (seconds) from the start of the video" as being the acquisition positions. The acquisition position determination unit 260 further determines the time information "zero second from the start of the video" and "t1*16 (seconds) from the start of the video" as being the acquisition positions.

The display still image generation unit 176 acquires the still image 22a corresponding to the acquisition position of "zero second from the start of the video". The display still image generation unit 176 further acquires the still image 22g corresponding to the acquisition position of "(t1*6) seconds from the start of the video". The display still image generation unit 176 further acquires the still image 22i corresponding to the acquisition position of "(t1*8) seconds from the start of the video". That is, the still image of the video B corresponding to the selection time information indicating "T1−(t1*8)" (seconds) is the still image 22i.

The display still image generation unit 176 further acquires the still image 22k corresponding to the acquisition position of "(t1*10) seconds from the start of the video". The display still image generation unit 176 further acquires the still image 22q corresponding to the acquisition position of "(t1*16) seconds from the start of the video". After this, the display still image generation unit 176 performs the image processing on the still images 22a, 22g, 22i, 22k, and 22q and generates display still images 42a, 42g, 42i, 42k, and 42q. In this case, the still image of the video B corresponding to the selection time information indicating "T1−(t1*8)" (seconds) is the still image 42i.

Next, the display still image acquisition unit 272 acquires the display still images 42a, 42g, 42i, 42k, and 42q from the image pickup apparatus 100. Next, the information processing terminal 200 displays a list of these display still images 42a, 42g, 42i, 42k, and 42q on the display unit 204. At this time, the display still images are displayed in such a way that the time intervals of the display still images in the vicinity of the display still image 42i corresponding to the selection time information indicating "T1−(t1*8)" (seconds) will become relatively short.

Figure 10:
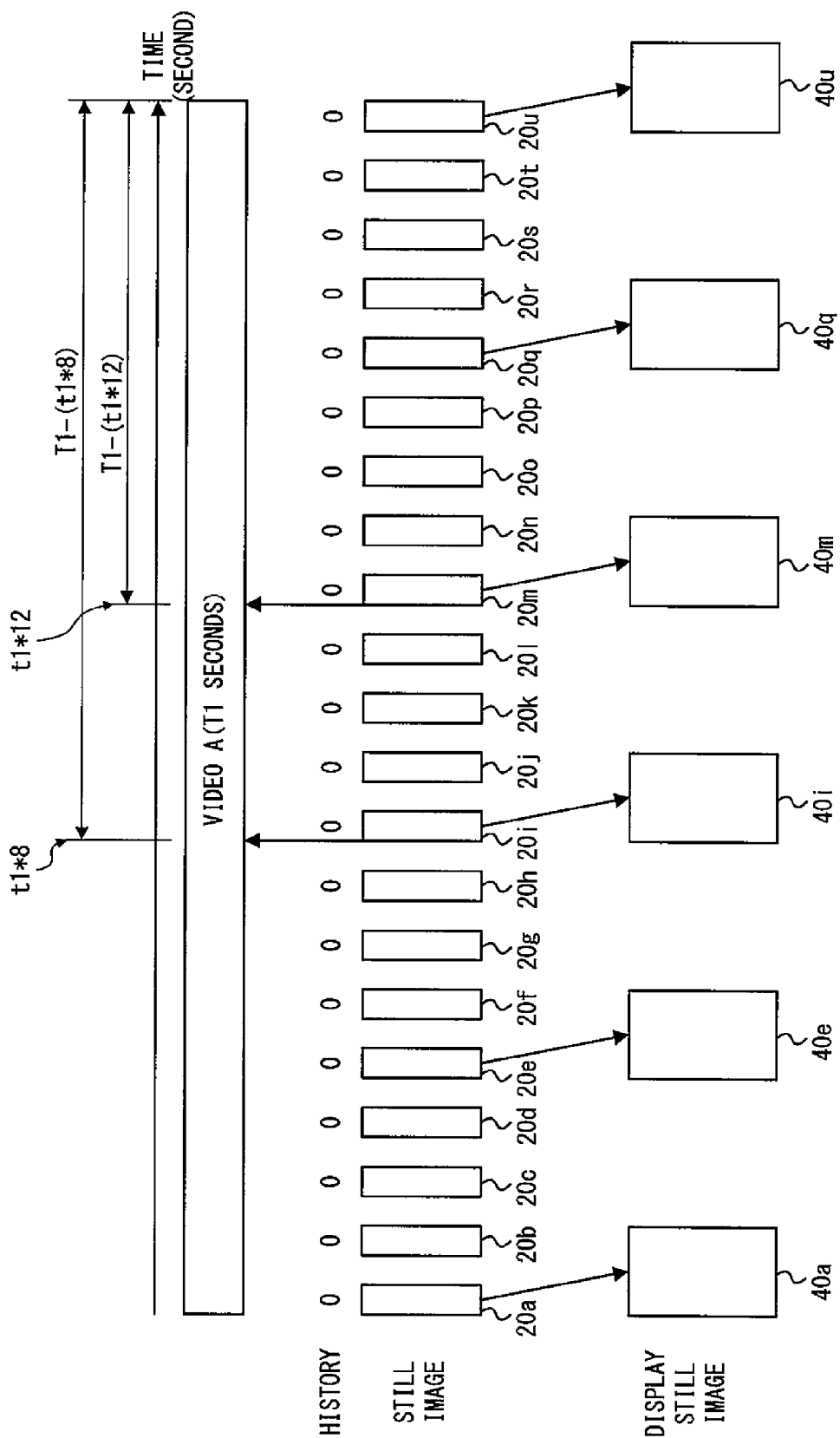
FIG. 10 is a drawing showing a second specific example for explaining the processes according to the first exemplary embodiment.
Figure 11:
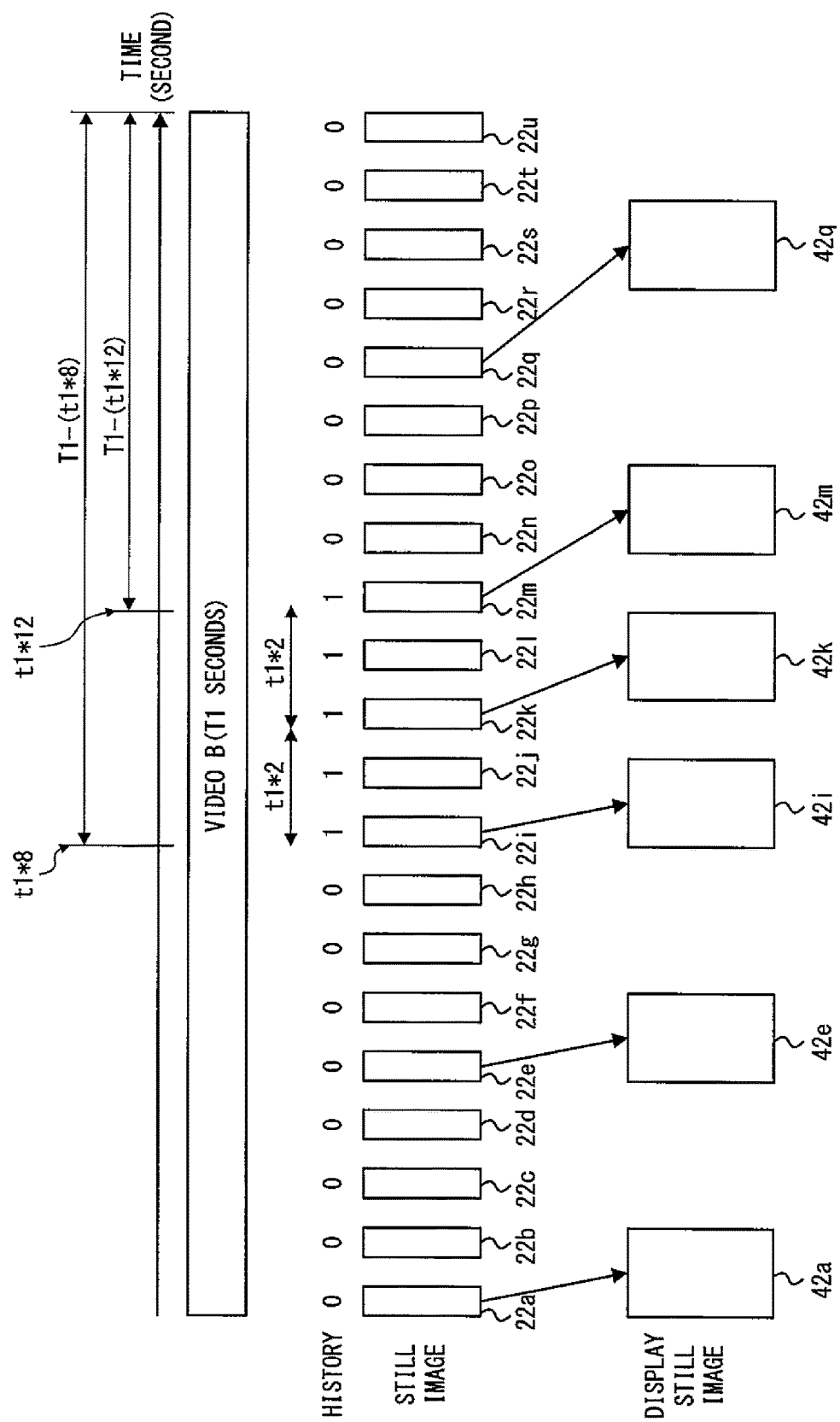
FIG. 11 is a drawing showing the second specific example for explaining the processes according to the first exemplary embodiment.

FIGS. 10 and 11 are drawings showing a second specific example for explaining the processes according to the first exemplary embodiment. In the second specific example, a period to play the video, i.e. start and end points, are specified. As shown in FIG. 10, in a manner similar to the first specific example, the image pickup apparatus 100 captures a video A and extracts still images 20a to 20u relating the video A. At this time, in the information processing terminal 200, assume that the selection history record unit 278 has not recorded the selection history. Additionally, the time intervals of the still images 20a to 20u shall be t1 seconds. In a manner similar to the first specific example, as the selection history record unit 278 has not recorded the selection history, in the process of S204 shown in FIG. 7, the acquisition position determination unit 260 determines the acquisition positions at equal intervals. Thus, the information processing terminal 200 acquires the display still images 40a, 40e, 40i, 40m, 40q, and 40u respectively corresponding to the still images 20a, 20e, 20i, 20m, 20q, and 20u which are at equal intervals and displays a list of these display still images on the display unit 204.

When the user selects the display still images 40i and 40m, by the process of the image pickup apparatus 100, the information processing terminal 200 plays the video in a period from the time position corresponding to the display still image 40i until the time position corresponding to the display still image 40m. When the capture time of the video is T1 seconds, the selection history record unit 278 records the selection time information indicating "T1−(t1*8)" (seconds), "T1−(t1*9)" (seconds), "T1−(t1*10)" (seconds), "T1−(t1*11)" (seconds), and "T1−(t1*12)" (seconds), which correspond to the above period.

Next, as shown in FIG. 11, in a manner similar to the first specific example, the image pickup apparatus 100 captures a video B and extracts still images 22a to 22u relating to the video B. The time intervals of the still images 22a to 22u shall be t1 seconds. Moreover, the capture time of the video B shall be T1 seconds.

At this time, as the selection history record unit 278 has recorded the selection history, in the process of S210 shown in FIG. 7, the acquisition position determination unit 260 evaluates the frequency of the selection time information. In this case, the acquisition position determination unit 260 evaluates the frequencies of the selection time information indicating "T1−(t1*8)" (seconds) to "T1−(t1*12)" (seconds) as being "one". The time position in the video B corresponding to the selection time information indicating "T1−(t1*8)" (seconds) is T1−(T1−(t1*8))=t1*8 seconds. Moreover, the time position in the video B corresponding to the selection time information indicating "T1−(t1*12)" (seconds) is T1−(T1−(t1*12))=t1*12 seconds.

Accordingly, the acquisition position determination unit 260 determines the acquisition position so that the time intervals in the period from the time position t1*8 (seconds) to t1*12 (seconds) will become relatively short. In this example, the acquisition position determination unit 260 determines the time intervals in the period from the time information "t1*8 (seconds) from the start of the video" until "t1*12 (seconds) from the start of the video" as being t1*2 (seconds) and the time intervals in a rest of the periods as being longer than t1*2 (seconds), for example, t1*4 (seconds) or the like.

In this case, the acquisition position determination unit 260 determines the time information "t1*8 (seconds) from the start of the video" and "t1*12 (seconds) from the start of the video" as being the acquisition positions. The acquisition position determination unit 260 further determines the time information "t1*10 from the start of the video" as being the acquisition position. The acquisition position determination unit 260 further determines the time information "zero second from the start of the video", "t1*4 (seconds) from the start of the video", and "t1*16 (seconds) from the start of the video" as being the acquisition positions.

Thus, the display still image acquisition unit 272 acquires, from the image pickup apparatus 100, the display still images 42*a*, 42*e*, 42*i*, 42*k*, 42*m*, and 42*q* corresponding to the time information that have been determined as being the above-mentioned acquisition positions. Next, the information processing terminal 200 displays a list of these display still images on the display unit 204. The display still images are displayed in such a way that the time intervals of the display still images 42*i*, 42*k*, and 42*m* corresponding to the selection time information from "T1−(t1*8)" (seconds) until "T1−(t1*12)" (seconds) will become relatively short.

Note that in the above-described second specific example, although the time intervals of the display still images are determined to be relatively short in the period between the two pieces of the time information of the selected two display still images, the present invention is not limited to this. The time intervals of the time information in the vicinity of the time information corresponding to the respective two pieces of selection time information may be determined to be relatively short. In the above example, the time intervals in the vicinity of the time position t1*8 (seconds) and in the vicinity of the time position t1*12 (seconds) may be determined to be short. The same applies to other exemplary embodiments which will be explained later.

Moreover, in the above second specific example, when the video is being played in S140, and the user stops playing the video before playing a scene corresponding to the display still image of a later time, which has been selected in S132, the selection time information may be rewritten. Specifically, in the above example, when the user stops playing the video at, for example, t1*10 (seconds), which is before t1*12 (seconds), the selection time information "T1−(t1*12)" may be rewritten as "T1−(t1*10)". The same applies to other exemplary embodiments which will be explained later.

In the above-described first and second specific examples, the acquisition position determination unit 260 determines the acquisition positions in such a way that the time intervals in the time corresponding to the selection time information having the low frequency of the selection will become longer than the time intervals in the time in which the selection time information has not been recorded. By doing so, in the period of time in which the frequency of the selection is high, more display still images could be displayed for the video B as compared to those displayed for the video A. On the other hand, in the period of time in which the frequency of the selection is low, fewer display still images could be displayed for the video B as compared to those displayed for the video A. With such a configuration, the number of the display still images displayed on the display unit 204 can be substantially constant. This enables the user to easily find a scene which the user desires to view without increasing the number of the display still images that are displayed on the display unit 204 when the size of the display unit 204 is not relatively large.

Figure 12:
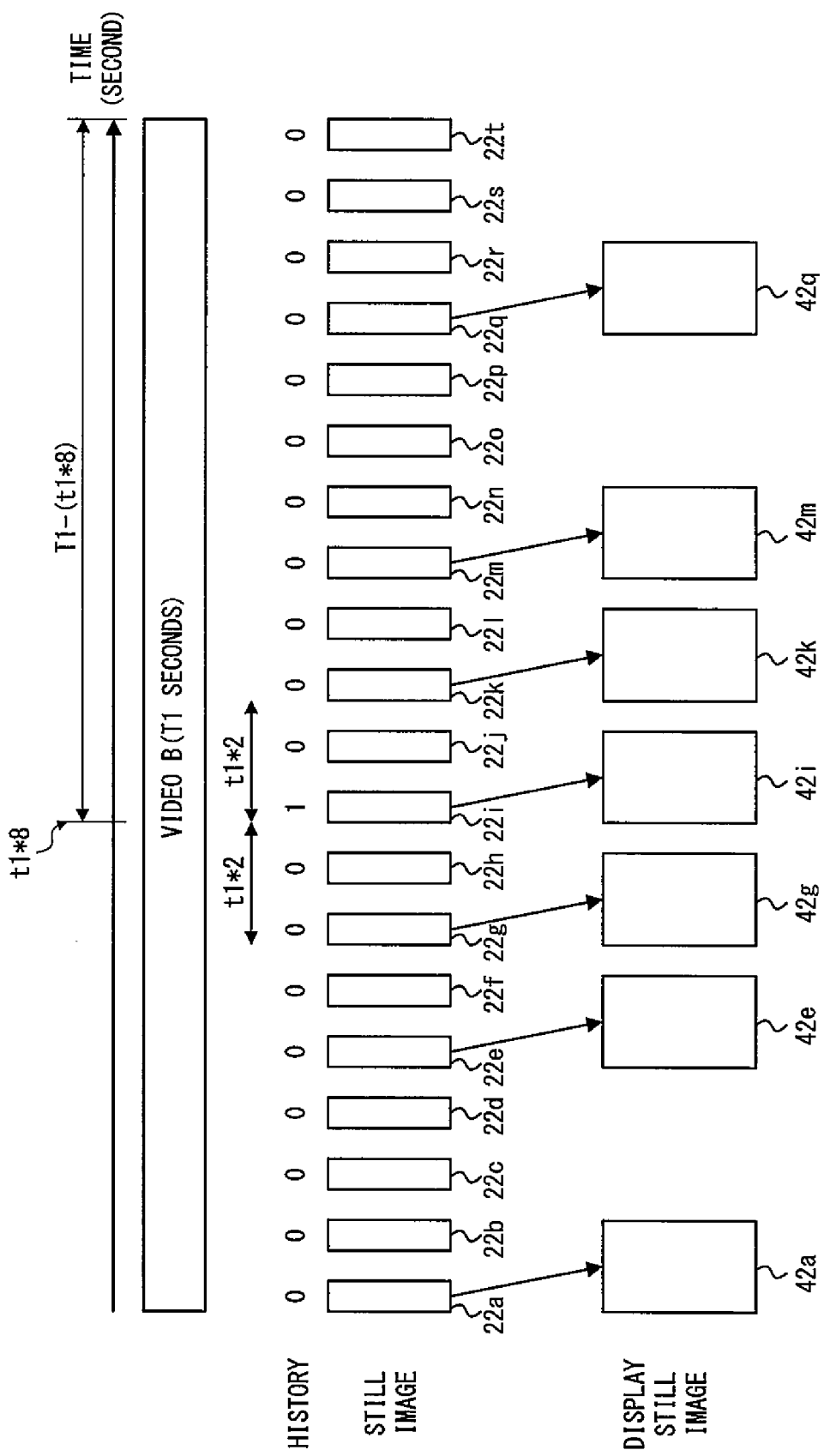
FIG. 12 is a drawing showing a third specific example for explaining the processes according to the first exemplary embodiment.

FIG. 12 is a drawing showing a third specific example for explaining the processes according to the first exemplary embodiment. In the third specific example, the number of the display still images that are displayed on the information processing terminal 200 increases in the period of time in which the frequency of the selection is high. Firstly, in a manner similar to that of the first specific example, video A is captured as shown in FIG. 8, and a list of display still images 40*a*, 40*e*, 40*i*, 40*m*, and 40*q* are displayed. After this, assume that the display still image 40*i* is selected. At this time, the selection history record unit 278 records the selection time information indicating "T1−(t1*8)" (seconds).

Next, in a manner similar to the first specific example, the image pickup apparatus 100 captures a video B and extracts still images 22*a* to 22*t* relating to the video B. Next, in a manner similar to the first specific example, the acquisition position determination unit 260 determines the acquisition positions in such a way that the time intervals in the vicinity of the time position t1*8 (seconds) will become relatively short. In this example, the acquisition position determination unit 260 determines the time intervals in the vicinity of the time information "t1*8 (seconds) from the start of the video" as being t1*2 (seconds). On the other hand, the acquisition position determination unit 260 determines the intervals of the time information other than the one mentioned above as being t1*4 (seconds) in a manner similar to the video A. In other words, the acquisition position determination unit 260 determines the same time information as the one for the video A as being the acquisition positions.

In this case, the acquisition position determination unit 260 determines the time information "t1*8 (seconds) from the start of the video" as being the acquisition position. The acquisition position determination unit 260 further determines two pieces of the time information "t1*6 (seconds) from the start of the video" and "t1*10 (seconds) from the start of the video" which are in the vicinity of the time information "t1*8 (seconds) from the start of the video" as being the acquisition positions. The acquisition position determination unit 260 further determines, in the same way as for the video A, the time information "zero second from the start of the video", "t1*4 (seconds) from the start of the video", "t1*12 (seconds) from the start of the video", and "t1*16 (seconds) from the start of the video" as being the acquisition positions.

Thus, the display still image acquisition unit 272 acquires, from the image pickup apparatus 100, the display still images 42*a*, 42*e*, 42*g*, 42*i*, 42*k*, 42*m*, and 42*q* corresponding to the time information that has been determined as being the above-mentioned acquisition positions and display a list of these display still images on the display unit 204. At this time, as the display still images in the vicinity of the display still image 42*i* corresponding to the selection time information "T1−(t1*8)" (seconds) has increased, the display still images are displayed in such a way that the time intervals in this period of time will become relatively short.

In the above-described third specific example, unlike the first and second specific examples, in the period of time in which the frequency of the selection is high, more display still images could be displayed for the video B as compared to those displayed for the video A. On the other hand, in the period of time in which the frequency of the selection is low, the number of the display still images that could be displayed for the video B were substantially the same as those displayed for the video A. With such a configuration, the display still images are displayed at relatively short time intervals in the period of time in which the frequency of the selection is high, and the display still images can be displayed at the almost the same time intervals as the time intervals when the selection time information has not been recorded even in the period of time in which the frequency of the selection is low.

Second Exemplary Embodiment

Next, a second exemplary embodiment shall be explained as follows. In a manner similar to the first exemplary embodiment, the second exemplary embodiment is realized by the apparatus and the system shown in FIGS. 1 to 3. In a manner similar to the first exemplary embodiment, an image pickup apparatus 100 according to the second exemplary embodiment includes the capture process unit 150 shown in FIG. 4. Further, in a manner similar to the first exemplary embodiment, the information processing terminal 200 according to the second exemplary embodiment includes the video checking process unit 250 shown in FIG. 5. Furthermore, in a manner similar to the first exemplary embodiment, the image pickup apparatus 100 and the information processing terminal 200 according to the second exemplary embodiment perform the processes as shown in the sequence diagram of FIG. 6. On the other hand, the process by the acquisition position determination unit 260 in S20 according to the second exemplary embodiment is different from that according to the first exemplary embodiment.

Figure 13:
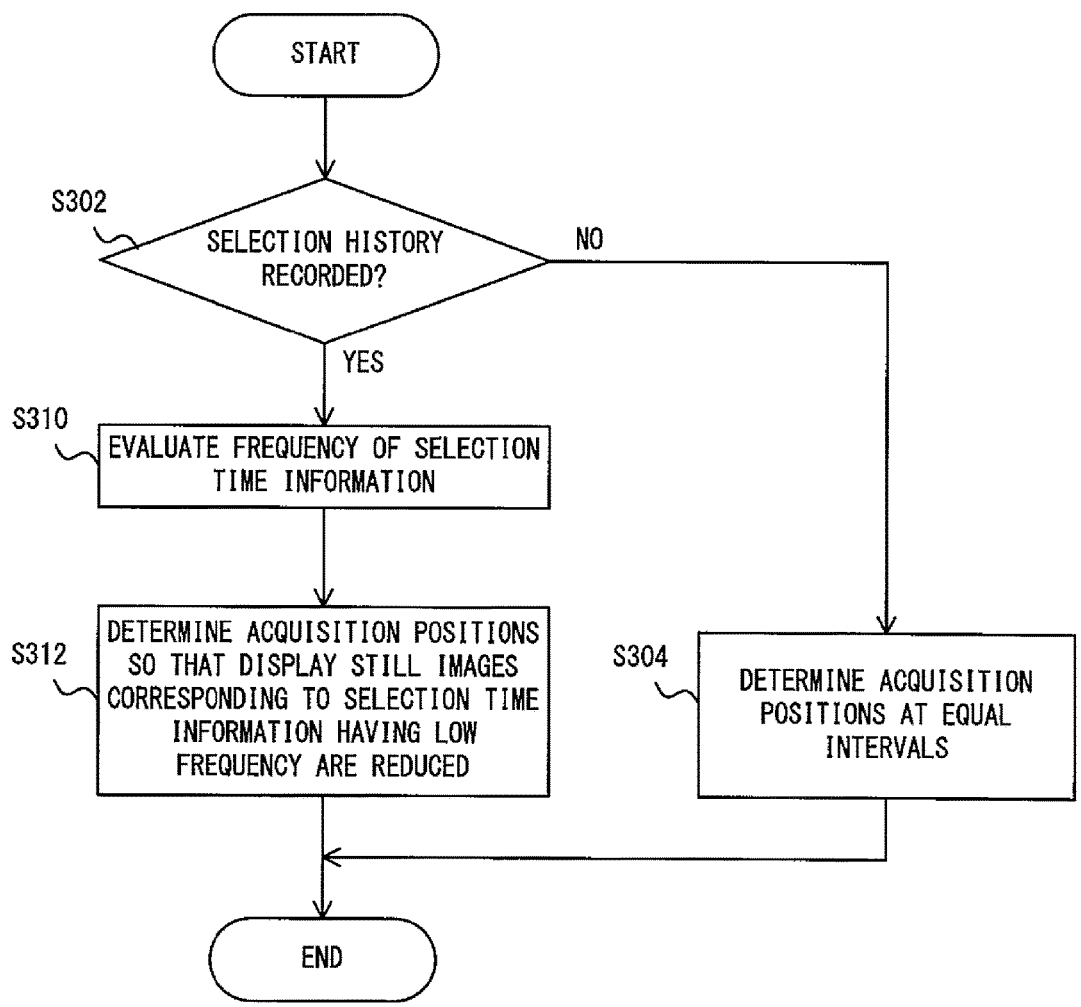
FIG. 13 is a flowchart showing processes by an acquisition position determination unit according to a second exemplary embodiment.

FIG. 13 is a flowchart showing processes by the acquisition position determination unit 260 according to the second exemplary embodiment. Firstly, in the step S302, in a manner similar to S202, the acquisition position determination unit 260 evaluates as to whether or not the selection history has been recorded in the selection history record unit 278. When the selection history has not been recorded, which is NO in the evaluation of S302, in a manner similar to S204, in the step S304, the acquisition position determination unit 260 determines the acquisition positions in such a way that the positions of the display still images which should be acquired on the time axis will be at equal intervals.

In the second exemplary embodiment, the time intervals of the display still images which should be acquired may be the same as the time intervals of the still images that have been stored in the still image storage unit 160. When the still images have been stored in the still image storage unit 160 at, for example, five-second intervals, the acquisition position determination unit 260 determines the acquisition positions as being five seconds. More specifically, the acquisition position determination unit 260 determines the acquisition positions as in "zero second from the start of the video", "five seconds from the start of the video", "ten seconds from the start of the video", and "15 seconds from the start of the video". Note that the time intervals of the display still images that should be acquired at this time may not be the same time intervals as those of the still images. The display still image may be acquired for every other still images that have been stored. Preferably, in the second exemplary embodiment, the time intervals of the display still images are shorter than those in the first exemplary embodiment.

On the other hand, when the selection history has been recorded, which is YES in the evaluation of S302, in a manner similar to S210, in the step S310, the acquisition position determination unit 260 evaluates the frequency of the selection time information. In the step S312, the acquisition position determination unit 260 determines the acquisition positions in such a way that the number of the display still images corresponding to the time information corresponding to the selection time information having the low frequency will be reduced.

An example, which has been mentioned above, in which the selection history record unit 278 records one piece of the selection time information indicating "three minutes until the end of the video" as being the selection time information, and the capture time of the video to be processed is five minutes shall be considered hereinafter. In this case, the acquisition position determination unit 260 determines the acquisition positions in such a way that the time intervals near the display still image corresponding to "two minutes from the start of the video" will become the same as the time intervals of the still images that have been stored in the still image storage unit 160. On the other hand, the acquisition position determination unit 260 determines the acquisition positions in such a way that the time intervals in the periods of time other than the period of time that is near the display still image corresponding to "two minutes from the start of the video" will become long.

More specifically, the acquisition position determination unit 260 determines the acquisition positions in such a way that the display still images are acquired at five-second intervals in the period of time in the vicinity of "two minutes from the start of the video". On the other hand, the acquisition position determination unit 260 determines the acquisition positions in such a way that the time intervals will become longer than five-second intervals such as, for example, ten-second intervals or the like in a rest of the periods of time of, for example, "four minutes from the start of the video".

Moreover, an example, which has been mentioned above, in which the selection history record unit 278 records one piece of the selection time information indicating "three minutes until the end of the video" as being the selection time information and two pieces of the selection time information indicating "two minutes until the end of the video" as being the selection time information, and the capture time of the video to be processed is five minutes shall be considered hereinafter. In this case, the acquisition position determination unit 260 determines the acquisition positions in such a way that the time intervals in the vicinity of the time information indicating "three minutes from the start of the video" will become five-second intervals. Moreover the acquisition position determination unit 260 determines the acquisition positions in such a way that the time intervals in the vicinity of the time information indicating "two minutes from the start of the video" will become longer than the time intervals in the period of time in the vicinity of the time information indicating "three minutes from the start of the video". Likewise, the acquisition position determination unit 260 determines the acquisition positions in such a way that the time intervals in the periods of time in the vicinity of other time information will become longer than the time intervals in the vicinity of the time information indicating "two minutes from the start of the video".

In detail, the acquisition position determination unit 260 determines the acquisition positions in such a way that the display still images are acquired at intervals longer than the five seconds, for example, ten-second intervals or the like in the vicinity of "two minutes from the start of the video". In addition, the acquisition position determination unit 260 determines the acquisition positions in such a way that the time intervals will become longer than ten-second intervals, for example, 20-second intervals or the like for other time positions, for example, "four minutes from the start of the video".

In the second exemplary embodiment, the display still images are displayed at short intervals even when the selection history has not been recorded. This enables the user to accurately select a scene which the user desires to view. The second exemplary embodiment is effective when the information processing terminal 200 includes the display unit 204 which is capable of displaying a number of display still images.

Further, in the second exemplary embodiment, by repeating the selections, it is possible to display the display still images at short intervals (i.e., finely) in the period of time in which the frequency of the selection is high while displaying the display still images at long intervals (i.e., coarsely) in the period of time in which the frequency of the selection is low. Therefore, when there are a plurality of pieces of the selection time information, the display still images can be easily displayed at short intervals in a plurality of periods of time.

Hereinafter, specific examples according to the second exemplary embodiment shall be explained by referring to the drawings.

Figure 14:
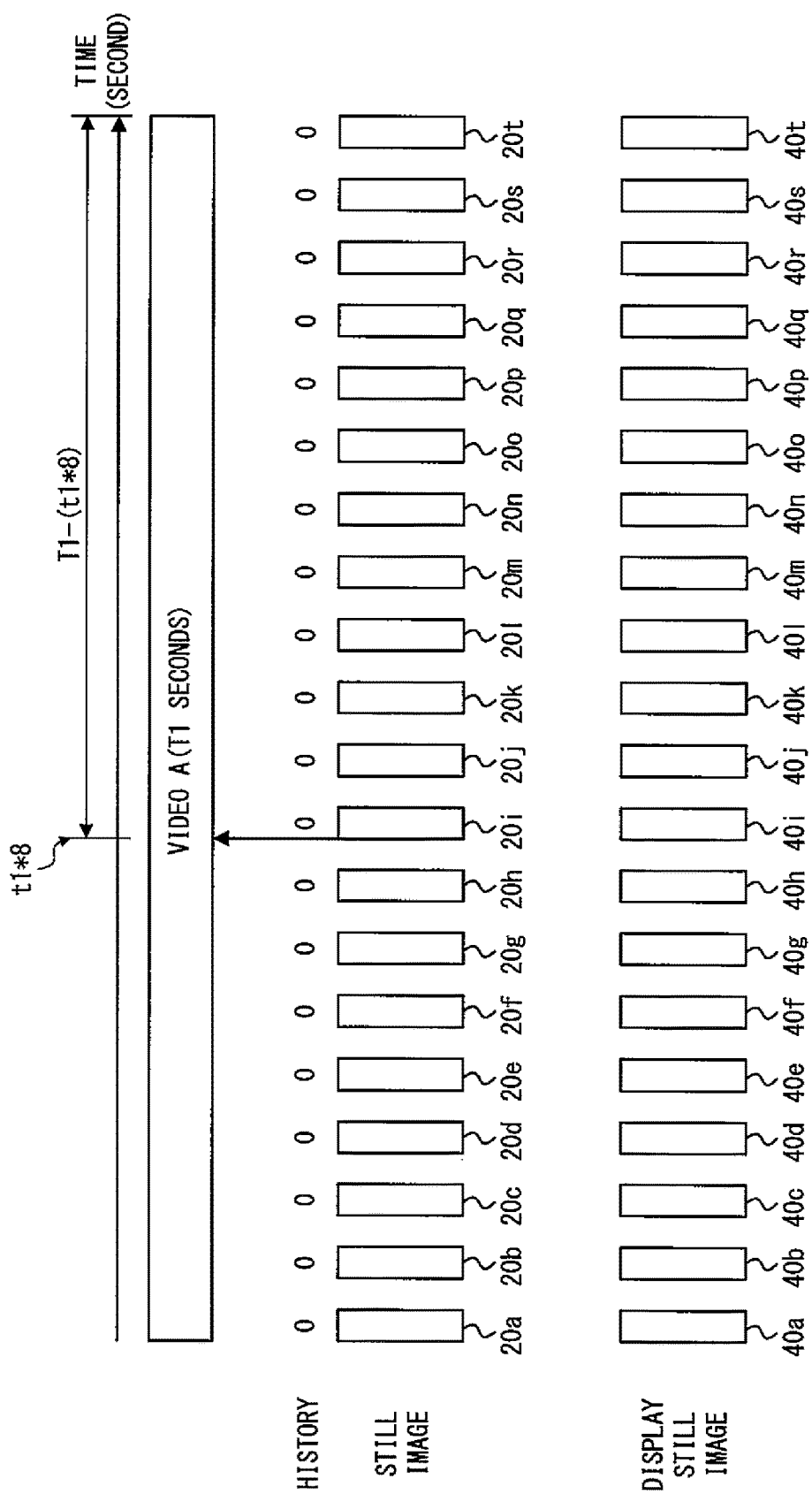
FIG. 14 is a drawing showing a first specific example for explaining processes according to the second exemplary embodiment.
Figure 15:
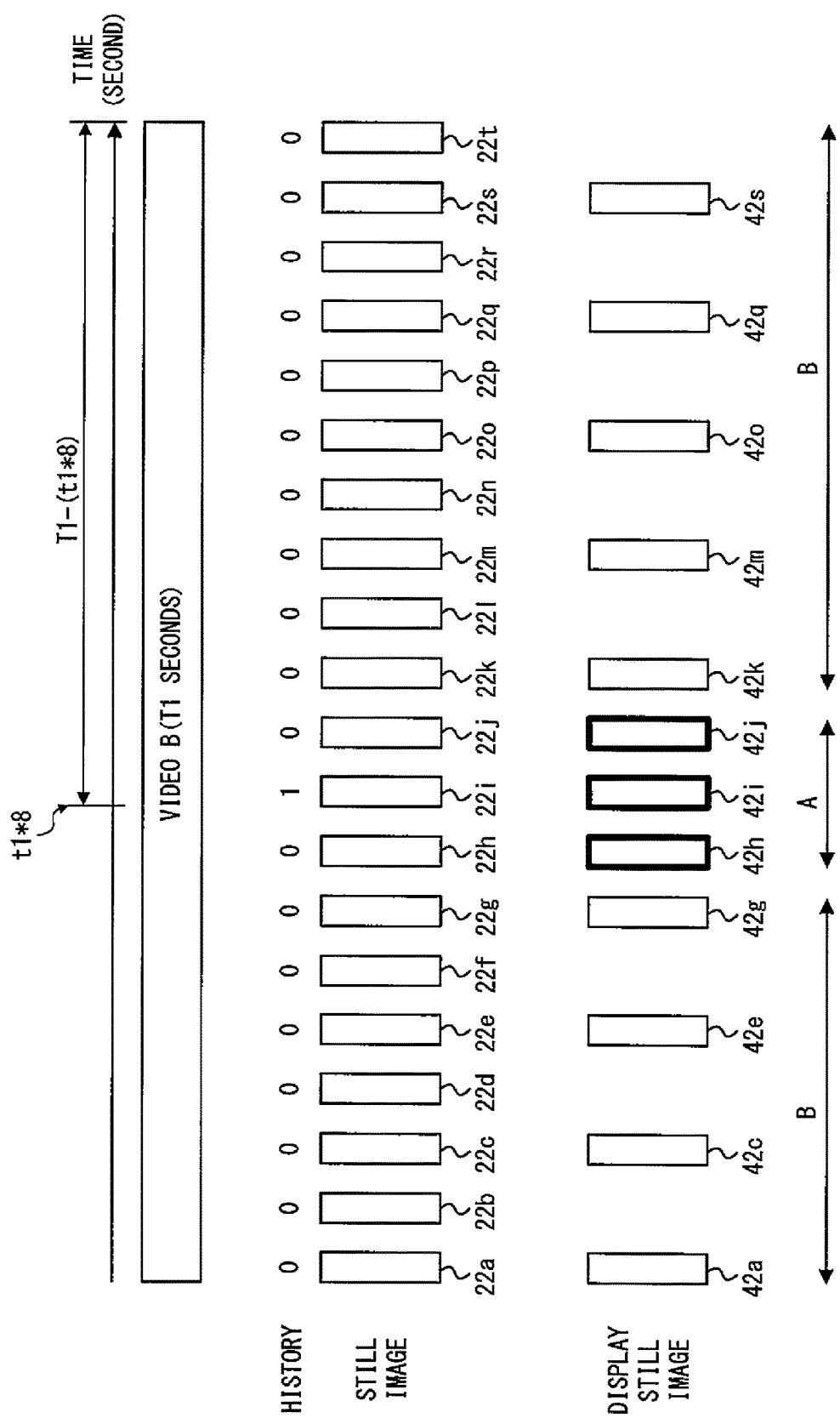
FIG. 15 is a drawing showing the first specific example for explaining the processes according to the second exemplary embodiment.

FIGS. 14 and 15 are drawings showing a first specific example for explaining the processes according to the second exemplary embodiment. In the first specific example, a point to start playing the video is specified. As shown in FIG. 14, the image pickup apparatus 100 captures a video A and extracts still images 20a to 20t relating to the video A. At this time, in the information processing terminal 200, assume that the selection history record unit 278 has not recorded the selection history. Additionally, the time intervals of the still images 20a to 20t shall be t1 seconds. In this case, as the selection history record unit 278 has not recorded the selection history, in the process of S304 shown in FIG. 13, the acquisition position determination unit 260 determines the acquisition positions at equal intervals, which are t1 seconds. More specifically, the acquisition position determination unit 260 determines the acquisition positions as in "zero second from the start of the video", "t1 seconds from the start of the video", "t1*2 (seconds) from the start of the video", "t1*3 (seconds) from the start of the video", and "t1*4 (seconds) from the start of the video".

Next, in a manner similar to the above-described specific examples, the display still image acquisition unit 272 acquires display still images 40a to 40t from the image pickup apparatus 100. Next, the information processing terminal 200 displays a list of the still images 40a to 40t on the display unit 204. Next, when the user selects the display still image 40i, by the process of the image pickup apparatus 100, the information processing terminal 200 plays the video from the time position corresponding to the display still image 40i, i.e. the time position corresponding to the still image 20i. When the capture time of the video is T1 seconds, the selection history record unit 278 records the selection time information indicating "T1−(t1*8)" (seconds).

Next, as shown in FIG. 15, the image pickup apparatus 100 captures a video B and extracts still images 22a to 22t relating to the video B. At this time, in the information processing terminal 200, the selection history record unit 278 has recorded the selection time information indicating "T1−(t1*8)" (seconds). Additionally, the time intervals of the still images 22a to 22t shall be t1 seconds. Moreover, the capture time of the video B shall be T1 seconds.

At this time, as the selection history record unit 278 has recorded the selection history, in the process of S310 shown in FIG. 13, the acquisition position determination unit 260 evaluates the frequency of the selection time information. In this case, the acquisition position determination unit 260 evaluates the frequency of the selection time information indicating "T1−(t1*8)" (seconds) as being "one". The time position in the video B corresponding to the selection time information indicating "T1−(t1*8)" (seconds) is T1−(T1−(t1*8))=t1*8 (seconds).

Accordingly, the acquisition position determination unit 260 determines the acquisition positions in such a way that the time intervals in the periods of time other than the period of time in the vicinity of the time position t1*8 (seconds) will become relatively long. In this example, the acquisition position determination unit 260 determines the time intervals in the periods of time B which is the period of time other than the period of time in the vicinity of the time information "t1*8 (seconds) from the start of the video" will become longer than t1 (seconds), for example, t1*2 (seconds) or the like. On the other hand, the acquisition position determination unit 260 determines the time intervals in the period of time A which is in the vicinity of the time information "t1*8 (seconds) from the start of the video" will become t1 (seconds) in a manner similar to the video A. In this example, the time intervals in a rest of the periods of time should only be longer than the time intervals in the period of time in the vicinity of the time information corresponding to the selection time information having the high frequency and do not necessarily have to be constant. The same applies to other specific examples.

In this case, the acquisition position determination unit 260 determines the time information "t1*8 (seconds) from the start of the video" as being the acquisition position. The acquisition position determination unit 260 further determines the time information in the period of time A which is "t1*7 (seconds) from the start of the video" and "t1*9 (seconds) from the start of the video" as being the acquisition positions. The acquisition position determination unit 260 further determines the time information corresponding to the period of time B which is, for example, "zero second from the start of the video", "t1*2 (seconds) from the start of the video", "t1*4 (seconds) from the start of the video", and "t1*6 (seconds) from the start of the video" as being the acquisition positions. Likewise, the acquisition position determination unit 260 determines the time information corresponding to the period of time B which is, for example, "t1*10 seconds from the start of the video", "t1*12 (seconds) from the start of the video", and "t1*14 (seconds) from the start of the video" and the like as being the acquisition positions.

The display still image generation unit 176 acquires still images 22a, 22c, 22e, and 22g respectively corresponding to the acquisition positions of "zero second from the start of the video", "t1*2 (seconds) from the start of the video", "t1*4 (seconds) from the start of the video", and "t1*6 (seconds) from the start of the video". The display still image generation unit 176 further acquires still images 22k, 22m, 22o, 22q, and 22s respectively corresponding to the acquisition positions of "t1*10 (seconds) from the start of the video", "t1*12 (seconds) from the start of the video", "t1*14 (seconds) from the start of the video" and the like.

The display still image generation unit 176 further obtains the still image 22h corresponding to the acquisition position of "t1*7 (seconds) from the start of the video". The display still image generation unit 176 further obtains the still image 22i corresponding to the acquisition position of "t1*8 (seconds) from the start of the video". That is, the still image of the video B corresponding to the selection time information indicating "T1−(t1*8)" (seconds) is the still image 22i. The display still image generation unit 176 further obtains the still image 22j corresponding to the acquisition position of "t1*9 (seconds) from the start of the video".

After this, the display still image generation unit 176 performs the image processing on the still images 22a, 22c, 22e, and 22g and generates display still images 42a, 42c, 42e, and 42g. Likewise, the display still image generation unit 176 performs the image processing on the still images 22h, 22i, and 22j and generates display still images 42h, 42i, and 42j. Similarly, the display still image generation unit 176 performs the image processing on the still images 22k, 22m, 22o, 22q, and 22s and generates display still images 42k, 42m, 42o, 42q, and 42s. The display still image of the video B corresponding to the selection time information indicating "T1−(t1*8)" (seconds) is the display still image 42i.

Next, the display still image acquisition unit 272 acquires the above-mentioned display still image 42a and the like from the image pickup apparatus 100. Next, the information processing terminal 200 displays a list of the above-mentioned display still image 42a and the like on the display unit 204. At this time, the display still images are displayed in such a way that the number of the display still images in the period of time in the vicinity of the display still image 42i corresponding to the selection time information indicating "T1−(t1*8)" (seconds) will become relatively large.

Figure 16:
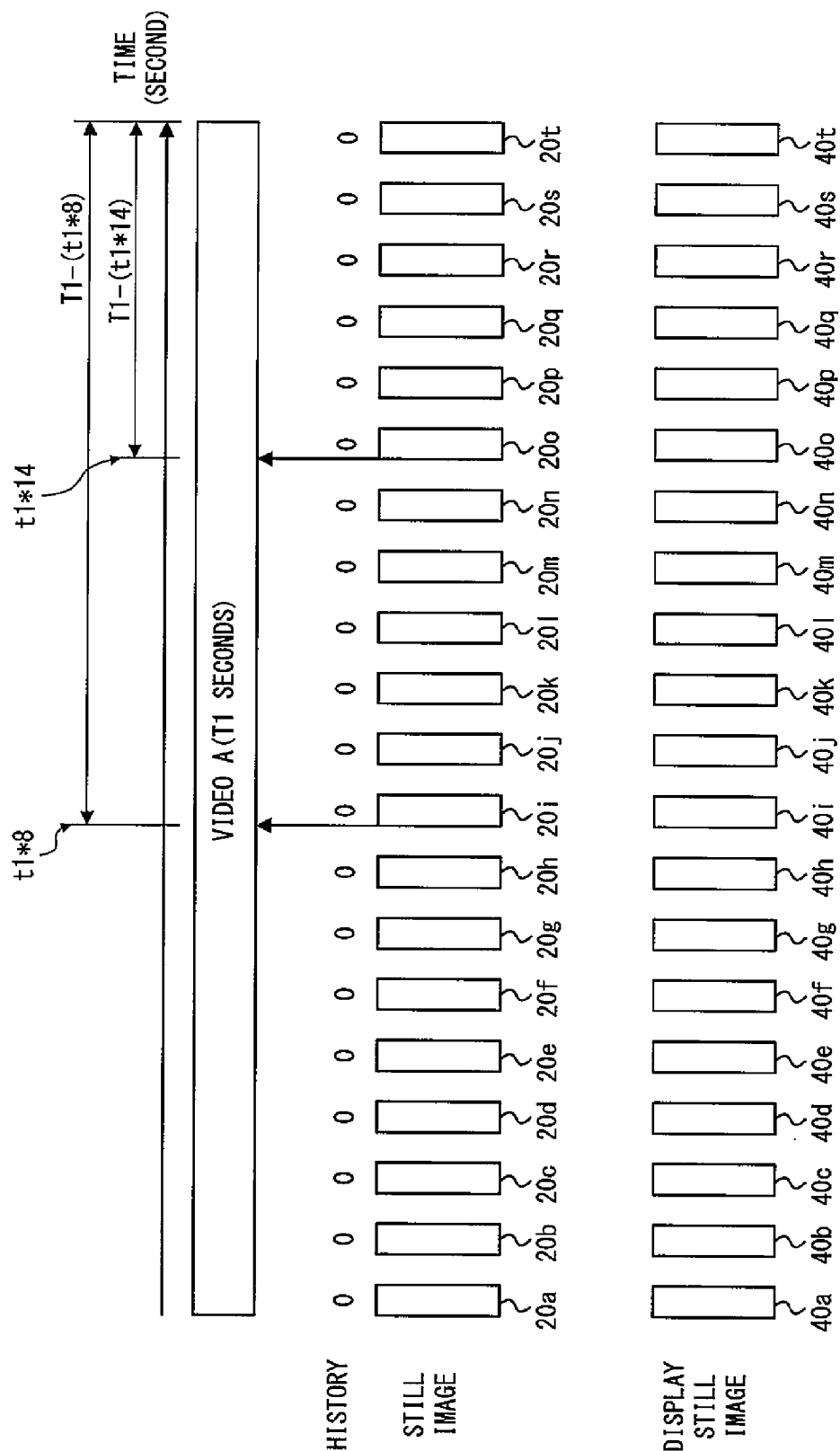
FIG. 16 is a drawing showing a second specific example for explaining the processes according to the second exemplary embodiment.
Figure 17:
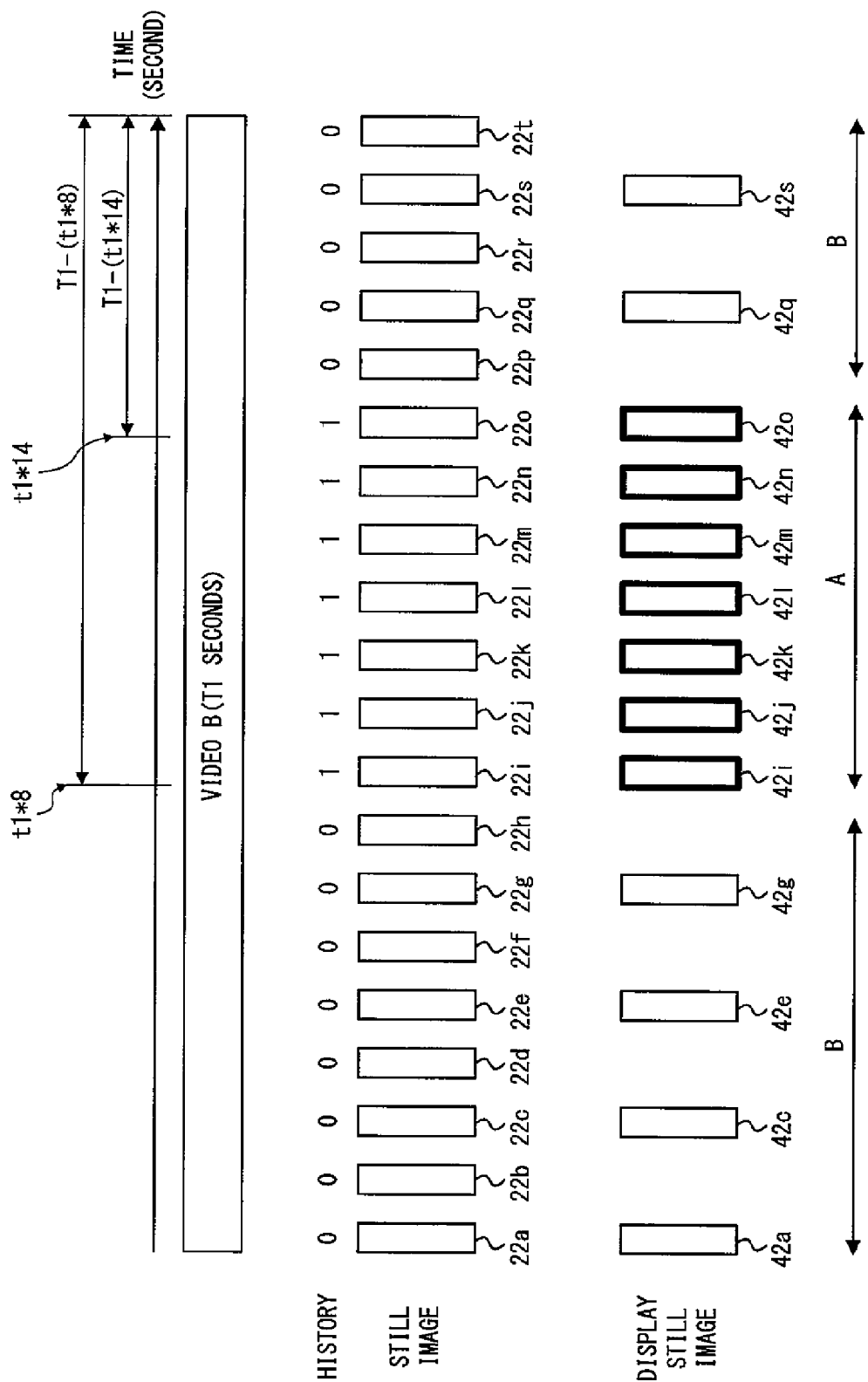
FIG. 17 is a drawing showing the second specific example for explaining the processes according to the second exemplary embodiment.

FIGS. 16 and 17 are drawings showing a second specific example for explaining the processes according to the second exemplary embodiment. In the second specific example, a period to play the video, i.e. start and end points, are specified. As shown in FIG. 16, in a manner similar to the first specific example, the image pickup apparatus 100 captures a video A and extracts still images 20a to 20t relating the video A. At this time, in the information processing terminal 200, assume that the selection history record unit 278 has not recorded the selection history. Additionally, the time intervals of the still images 20a to 20t shall be t1 seconds. In this case, in a manner similar to the above-mentioned first specific example, as the selection history record unit 278 has not recorded the selection history, in the process of S304 shown in FIG. 13, the acquisition position determination unit 260 determines the acquisition positions at equal intervals, which are t1 seconds. Next, the information processing terminal 200 acquires display still images 40a to 40t respectively corresponding to the still images 20a to 20t and displays a list of these display still images on the display unit 204.

When the user selects the display still images 40i and 40o, by the process of the image pickup apparatus 100, the information processing terminal 200 plays the video from the time position corresponding to the display still image 40i until the time position corresponding to the display still image 40o. When the capture time of the video is T1 seconds, the selection history record unit 278 records the selection time information indicating "T1−(t1*8)" (seconds) to"T1−(t1*14)" (seconds) that corresponds to the above-mentioned period.

Next, as shown in FIG. 17, in a manner similar to the first specific example, the image pickup apparatus 100 captures a video B and extracts still images 22a to 22t relating to the video B. Additionally, the time intervals of the still images 22a to 22t shall be t1 seconds. Moreover, the capture time of the video B shall be T1 seconds.

At this time, as the selection history record unit 278 has recorded the selection history, in the process of S310 shown in FIG. 13, the acquisition position determination unit 260 evaluates the frequencies of the selection time information. In this case, the acquisition position determination unit 260 evaluates the frequency of the selection time information indicating "T1−(t1*8)" (seconds) to "T1−(t1*14)" (seconds) as being "one".

Accordingly, the acquisition position determination unit 260 determines the acquisition positions in such a way that the time intervals in the period of time other than the period from the time positions t1*8 (seconds) to t1*14 (seconds) will become relatively long. In this example, the acquisition position determination unit 260 determines the time intervals in the period of time B which is the period of time other than the period of time A corresponding to the above-mentioned period to become longer than t1 (seconds), for example, t1*2 (seconds) or the like.

In this case, the acquisition position determination unit 260 determines the time information corresponding to the period of time A between the time information "t1*8 (seconds) from the start of the video" until the time information "t1*14 (seconds) from the start of the video" as the acquisition positions. Moreover, the acquisition position determination unit 260 determines the time information corresponding to the period of time B which is, for example, the time information "zero second from the start of the video", "t1*2 (seconds) from the start of the video" and the like as the acquisition positions.

Thus, the display still image acquisition unit 272 acquires, from the image pickup apparatus 100, the display still images 42a, 42c, 42e, 42g, 42i to 42o, 42q, and 42s corresponding to the time information determined as being the above-mentioned acquisition positions and displays a list of these display still images on the display unit 204. These display still images are displayed in such a way that the number of the display still images in the period of time corresponding to the display still images 42i to 42o which correspond to the selection time information from the time information indicating "T1−(t1*8)" (seconds) until "T1−(t1*14)" (seconds) will become relatively large.

Third Exemplary Embodiment

Next, a third exemplary embodiment shall be explained as follows. In a manner similar to the first exemplary embodiment, the third exemplary embodiment is realized by the apparatus and the system shown in FIGS. 1 to 3. In a manner similar to the first exemplary embodiment, the image pickup apparatus 100 according to the third exemplary embodiment includes the capture process unit 150 shown in FIG. 4. Further, in a manner similar to the first exemplary embodiment, the information processing terminal 200 according to the third exemplary embodiment includes the video checking process unit 250 shown in FIG. 5. Furthermore, in a manner similar to the first exemplary embodiment, the image pickup apparatus 100 and the information processing terminal 200 according to the third exemplary embodiment perform the processes as shown in the sequence diagram of FIG. 6.

On the other hand, the process by the list display control unit 274 in S130 according to the third exemplary embodiment is different from that according to the first and second exemplary embodiments. Specifically, in a manner similar to the first exemplary embodiment, the list display control unit 274 controls the display unit 204 to display a list of the display still images that have been transmitted from the display still image acquisition unit 272. At this time, the list display control unit 274 is configured to control the display unit 204 in such a way that the sizes of the display still images which will be displayed will be different from each other according to the frequency of the selection time information in the selection history. The details of the above process shall be explained as follows.

Figure 18:
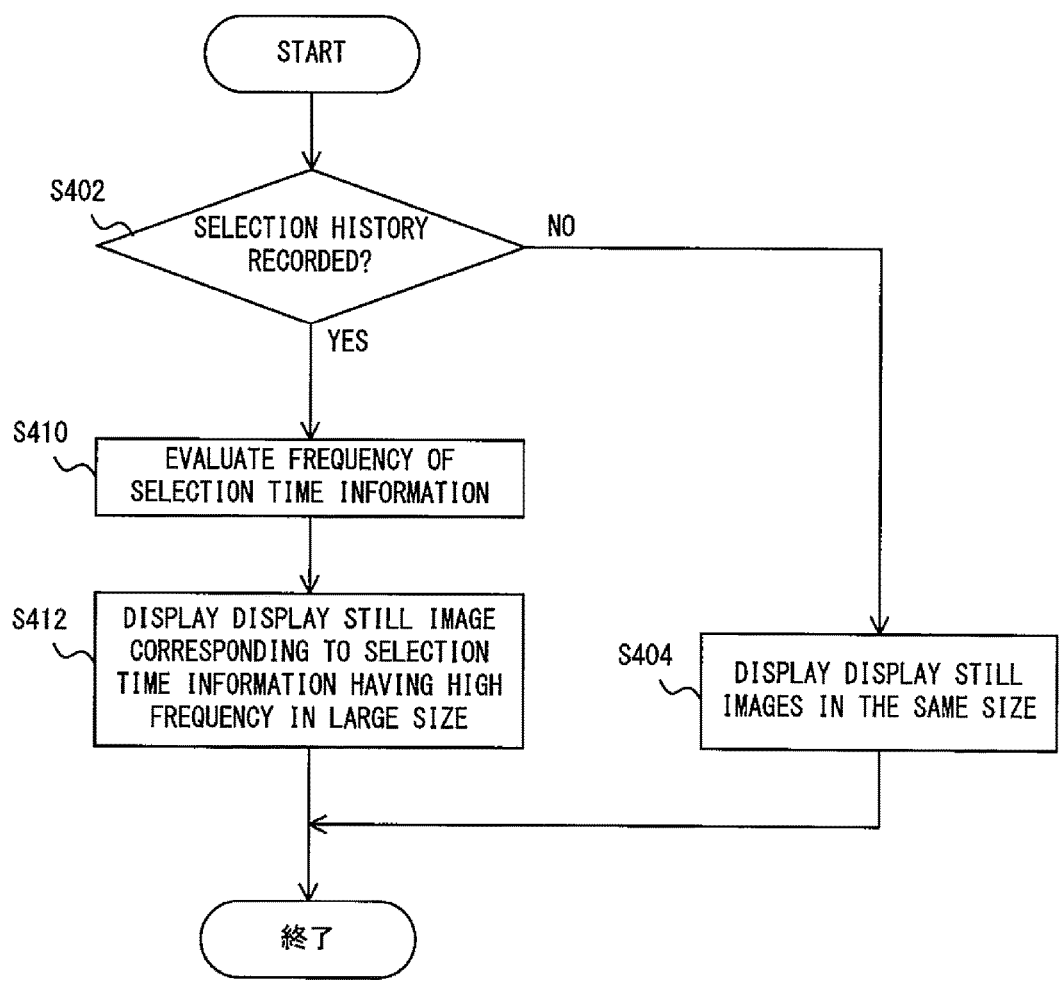
FIG. 18 is a flowchart showing processes by a list display control unit according to a third exemplary embodiment.

FIG. 18 is a flowchart showing the processes by the list display control unit 274 according to the third exemplary embodiment. Firstly, in the step S402, the list display control unit 274 evaluates as to whether or not the selection history has been recorded in the selection history record unit 278. When the selection history has not been recorded, which is NO in the evaluation of S402, in a manner similar to other exemplary embodiments, in the step S404, the list display control unit 274 instructs the display unit 204 to display the display still images in such a way that all the display still images are displayed in the same size.

On the other hand, when the selection history has been recorded, which is YES in the evaluation of S402, in a manner similar to the process in S210, in the step S410, the list display control unit 274 evaluates the frequency of the selection time information. In the step S412, the list display control unit 274 instructs the display unit 204 to display the display still images in such a way that the size of the display still image corresponding to the time information corresponding to the selection time information having the high frequency will become greater than those of other display still images.

Assume that the selection history record unit 278 has recorded one piece of the selection time information indicating "three minutes until the end of the video" as the selection time information. When the capture time of the video to be processed is five minutes, the time information corresponding to the selection time information indicating "three minutes until the end of the video" is the information indicating "two minutes from the start of the video". In this case, the display still image corresponding to the selection time information having the high frequency is the display still image corresponding to the time information indicating "two minutes from the start of the video". Accordingly, the list display control unit 274 instructs the display unit 204 to display the display still image corresponding to the time information indicating "two minutes from the start of the video" in such a way that the size of this display still image will become greater than those of other display still images.

Additionally, assume that the selection history record unit 278 has recorded one piece of the selection time information indicating "three minutes until the end of the video" and two pieces of the selection time information indicating "two minutes until the end of the video" as the selection time information. When the capture time of the video to be processed is five minutes, the time information corresponding to the selection time information indicating "three minutes until the end of the video" is the information indicating "two minutes from the start of the video", while the time information corresponding to the selection time information indicating "two minutes until the end of the video" is the information indicating "three minutes from the start of the video". In this case, the display still image corresponding to the selection time information having the highest frequency is the display still image corresponding to the time information indicating "three minutes from the start of the video". Further, the display still image corresponding to the selection time information having the second highest frequency is the display still image corresponding to the time information indicating "two minutes from the start of the video".

Therefore, the list display control unit 274 instructs the display unit 204 to display the display still images in such a way that the size of the display still image corresponding to the time information indicating "three minutes from the start of the video" will be the greatest. Further, the list display control unit 274 instructs the display unit 204 to display the display still images in such a way that the size of the display still image corresponding to the time information indicating "two minutes from the start of the video" will be the second greatest.

Hereinafter, specific examples of the third exemplary embodiment shall be explained by referring to the drawings. Note that although the following specific examples are applied to the above-explained second exemplary embodiment, the third exemplary embodiment can also be applied to the first exemplary embodiment. In the following specific examples, although it is configured in such a way that the display still image corresponding to the selection time information having the high frequency is displayed to be larger than other display still images, the display still image corresponding to the time information having the low frequency may be displayed to be smaller than other display still images.

Figure 19:
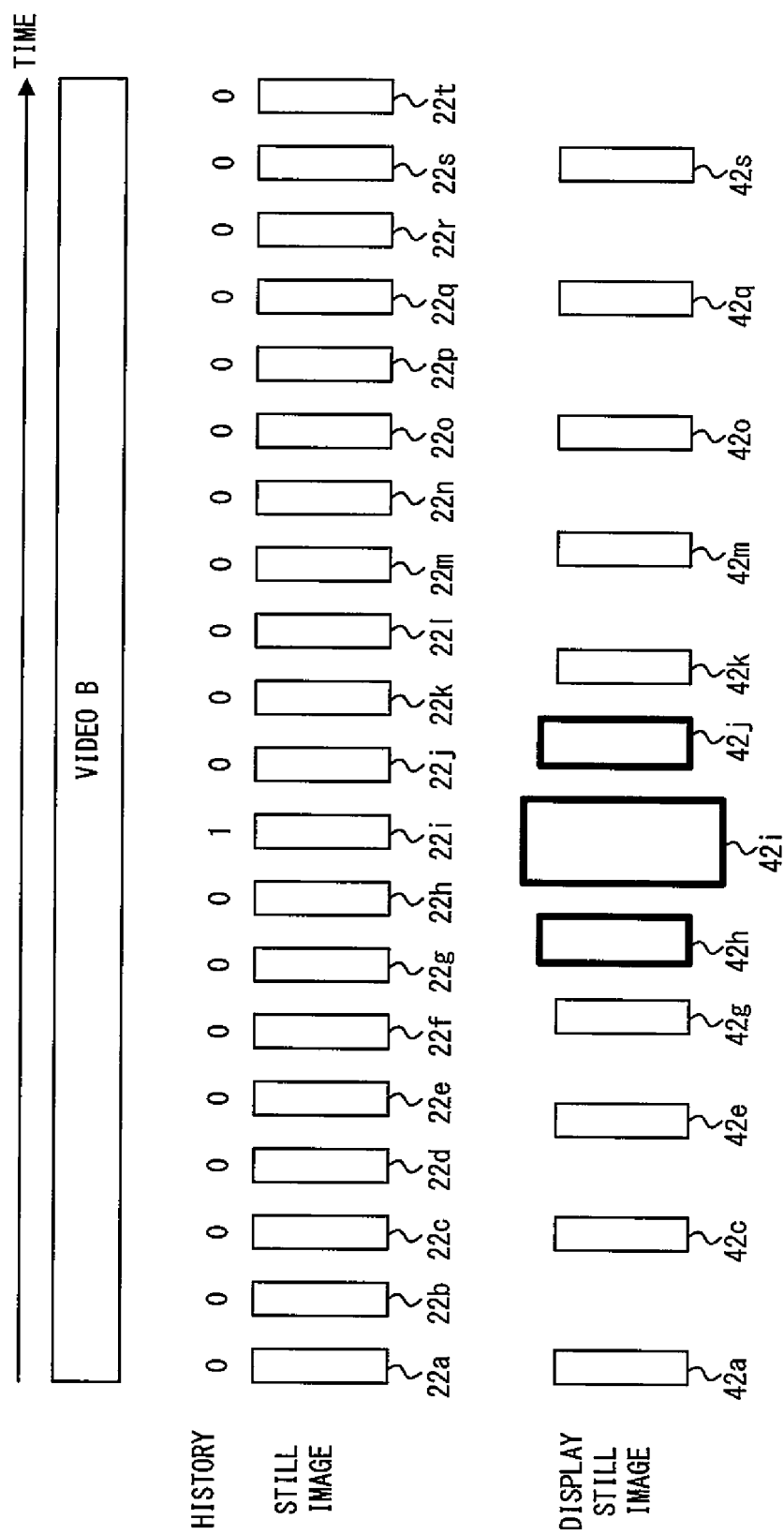
FIG. 19 is a drawing showing a first specific example for explaining processes according to the third exemplary embodiment.

FIG. 19 is a drawing showing a first specific example for explaining the processes according to the third exemplary embodiment. In the first specific example, a point of starting to play video is specified. Note that the example shown in FIG. 19 corresponds to the first specific example according to the second exemplary embodiment shown in FIG. 15.

As has been explained by referring to FIG. 15, the display still image corresponding to the selection time information "T1−(t1*8)" is the display still image 42i. Accordingly, as shown in FIG. 19, the list display control unit 274 controls the display unit 204 to display the display still images in such a way that the size of the display still image 42i which is the display still image corresponding to the selection time information having the high frequency will become greater than those of other display still images. Note that as shown in FIG. 19, the list display control unit 274 may control the display unit 204 to display the display still images in such a way that the sizes of the display still images 42h and 42j which are respectively the display still images in the vicinity of the display still image 42i will be smaller than that of the display still image 42i and greater than those of other display still images.

Figure 20:
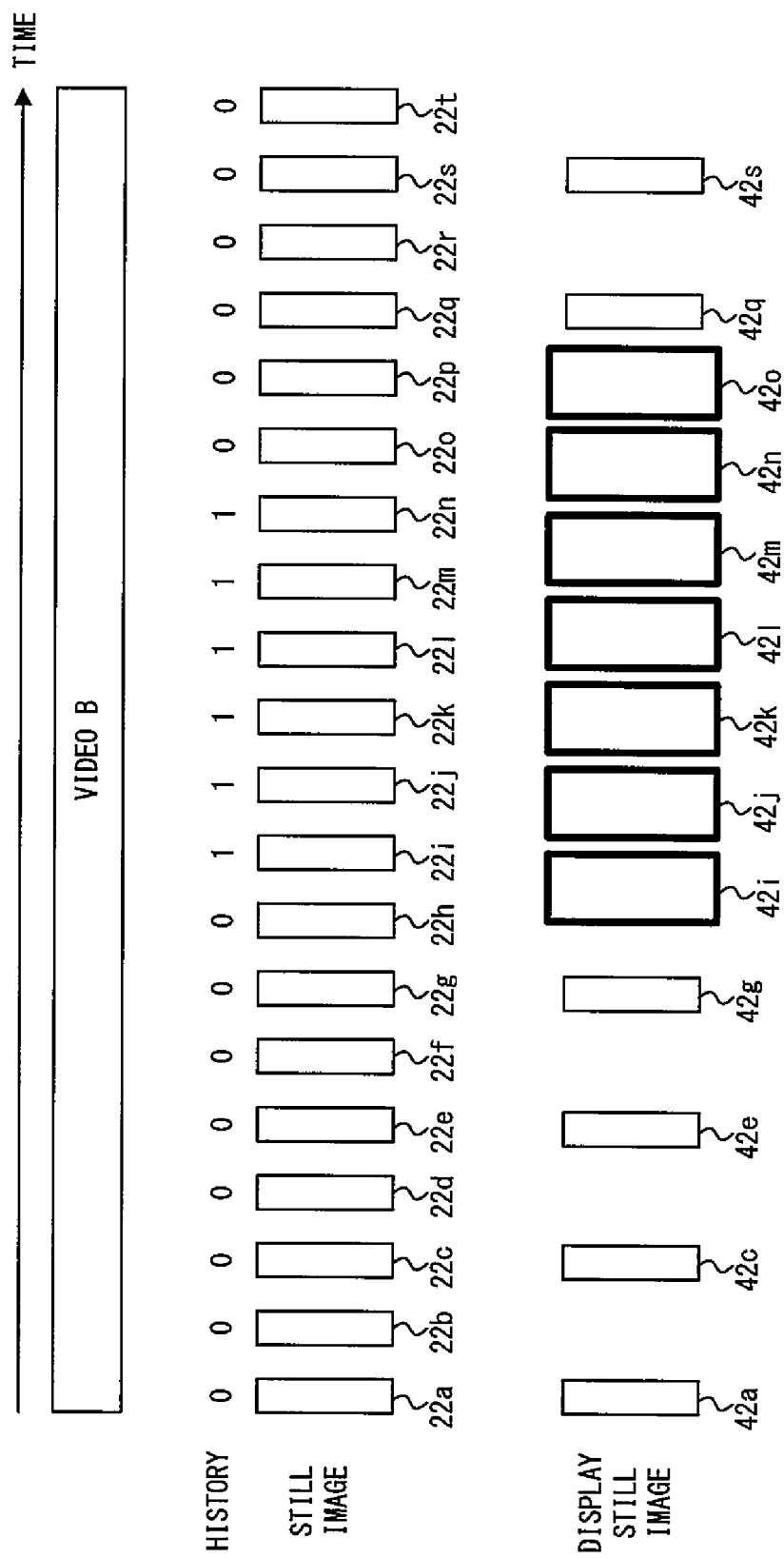
FIG. 20 is a drawing showing a second specific example for explaining the processes according to the third exemplary embodiment.

FIG. 20 is a drawing showing a second specific example for explaining the processes according to the third exemplary embodiment. In the second specific example, a period to play the video, i.e. start and end points, are specified. Note that the example shown in FIG. 20 corresponds to the second specific example according to the second exemplary embodiment shown in FIG. 17.

As has been explained by referring to FIG. 17, the display still images corresponding to the selection time information "T1−(t1*8)" to "T1−(t1*14)" are the display still images 42*i* to 42*o*. Accordingly, as shown in FIG. 20, the list display control unit 274 controls the display unit 204 to display the display still images in such a way that the sizes of the display still images 42*i* to 42*o* which are the display still images corresponding to the selection time information having the high frequencies will become greater than those of other display still images. Note that the list display control unit 274 may control the display unit 204 to display the display still images in such a way that the sizes of the display still images in the vicinity of the display still images 42*i* to 42*o* will be smaller than those of the display still images 42*i* to 42*o* and greater than those of other display still images.

In the third exemplary embodiment, it is possible to display the display still images in such a way that the sizes of the display still images in the period of time in which the frequency of the selection is high will become greater than those of other display still images. This enables the user to easily check the display still images in the period of time in which the frequency of the selection is high, i.e. scenes having a high chance that the user desires to view.

Modified Example

Note that the present invention is not limited to the above-described exemplary embodiments, and modifications can be made as appropriate without departing from the scope thereof. For example, at least one of the components of the image unit 150 shown in FIG. 4 may be realized by the information processing terminal 200. Likewise, at least one of the components of the video checking process unit 250 shown in FIG. 5 may be realized by the image pickup apparatus 100. Moreover, the capture process unit 150 and the video checking process unit 250 may be realized by one apparatus. In such a case, as shown in FIGS. 2 and 3, the apparatus includes an information processing apparatus, an operation unit, a display unit, and a capture unit. The apparatus captures a video by the capture unit provided therein, realizes the capture process unit 150 and the video checking process unit 250 by the information processing apparatus, and displays the display still images on the display unit.

In addition, the above-described order of the processes in the sequence diagrams and flowcharts can be changed as appropriate. At least one of the plurality of processes in the above-described sequence diagram and flowcharts may be omitted. When, for example, the selection history has not been recorded, the processes in S116, S20, and S122 which are shown in FIG. 6 may be omitted. In such a case, when the information processing terminal 200 gives the instruction to stop capturing the video, the instruction to stop capturing the video may include the information indicating the time intervals of the display still images. The time intervals in this case may be equal intervals. The image pickup apparatus 100 generates the display still images at the specified intervals and transmits the display still images to the information processing terminal 200 in the process of S124. Note that the time intervals of the display still images may be specified in the process of S104.

Moreover, in the above-described exemplary embodiments, although it has been explained that the image pickup apparatus 100 is configured to extract the still images while capturing the video, the present invention is not limited to this. The still images may be extracted when, for example, the video capture is ended. However, when the still images are extracted while capturing the video, the time taken for the list of the display still images to be displayed after the video capture is ended will be shorter than the time taken for the list of the display still images to be displayed when the still images are extracted after the video capture is ended.

On the other hand, the process to extract the still images from the video may be performed after the process by the acquisition position determination unit 260. In this case, the still image storage unit 160 may not be provided. Further in this case, in the image pickup apparatus 100, only the still images relating to the acquisition positions that have been determined by the acquisition position determination unit 260 may be extracted, and the display still images for the extracted still images may be generated.

Moreover, in the above-described exemplary embodiments, although it has been explained that the image pickup apparatus 100 is configured to extract the still images, the present invention is not limited to this. The information processing terminal 200 may extract the still images. In such a case, the image pickup apparatus 100 transmits the captured video, i.e. moving image data, to the information processing terminal 200 in real time. By doing so, the information processing terminal 200 will be no longer necessary to communicate with the image pickup apparatus 100 after stopping to capture the video. This further reduces the time until the list of the display still images are displayed after the video capture is ended.

In the above-described exemplary embodiments, although it has been explained that the display still images are generated when the information processing terminal 200 requests the display still images, the present invention is not limited to this. The display still images may be generated when the still images are extracted. By doing so, as the image processing will no longer be necessary after stopping to capture the video, the time taken for the list of the display still images to be displayed after stopping to capture the video will become shorter than the configuration described in the above exemplary embodiments. However, as the image processing is performed on all the extracted still images, more resources of information processing could be consumed than in the configuration described in the above exemplary embodiments.

Moreover, when the size of the moving image data is limited, i.e. the video file, which is created by the image pickup apparatus 100, the video could be divided into a plurality of video files. In this case, the image pickup apparatus 100 may extract the still images for all the divided video files.

Alternatively, the information processing terminal 200 may record a marker while the video is being captured. The marker is recorded, for example, by the user operating the operation unit of the information processing terminal 200 in regard to a scene the user is interested in. The marker includes the time information indicating the recorded time. Further, the information processing terminal 200 may include the time information relating to the marker in the instruction to stop capturing the video. In such a case, the image pickup apparatus 100 may generate the display still images for the still image corresponding to the above-mentioned time information and the still images in the period of time in the vicinity of the still image. This makes it possible to display the display still images in such a way that the time intervals will become short for the scene the user is interested in even when there is no selection history. The marker record may be combined with the selection history. More specifically, the time information indicating the time in which the marker is recorded may be used as the selection time information.

In the above-described exemplary embodiments, although it has been explained that the selection history which is the "selection time information" indicates the time from the end of the video, the present invention is not limited to this. The "selection time information" may indicate the time from the start of the video. Moreover, the "selection time information" may indicate a percentage of the time that has passed in the time from the start to the end of the video.

Further in the above-described exemplary embodiments, although it has been explained that the selection time information corresponding to the time information relating to the display still images that have been selected in S132 is always recorded, the present invention is not limited to this. When the time from when the video is played in S140 until the user stops playing the video is shorter than a predetermined time, the selection time information in this time may be deleted, as it is considered that the user is not interested in the corresponding scene.

In the above-described exemplary embodiment, the term "equal interval" is not limited to a precisely equal interval. The interval that is shifted by a time that can be recognized by someone as being an "equal interval", for example a time shifted by 0.5 second, shall be considered as being "equal interval" in the present invention.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first, second, and third exemplary embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A video capture system comprising:
an information processing terminal; and
an image pickup apparatus configured to be capable of communicating with the information processing terminal and capture a video in response to an instruction from the information processing terminal, wherein
the information processing terminal comprises:
a stop instruction unit realized by an integrated circuit configured to instruct the image pickup apparatus to stop capturing the video;
a display still image acquisition unit realized by the integrated circuit configured to acquire a plurality of display still images in response to a stop instruction from the stop instruction unit, the plurality of display still images being extracted from the video captured by the image pickup apparatus;
a display configured to display a list of the plurality of display still images acquired by the display still image acquisition unit; and
the display still image includes time information relating to a time in the video,
the information processing terminal further comprises:
a selection unit realized by the integrated circuit configured to select at least one display still image from the plurality of display still images displayed on the display unit; and
a history record unit realized by the integrated circuit configured to record a history of a selection based on the time information relating to the display still image selected by the selection unit, and
the display still image acquisition unit acquires the display still image according to the history recorded by the history record unit.

2. The video capture system according to claim 1, wherein
the history includes selection time information corresponding to the time information of the selected display still image,
the information processing terminal further comprises:
an acquisition position determination unit realized by the integrated circuit configured to determine positions on a time axis of the video respectively corresponding to the display still images which should be acquired by the display still image acquisition unit in such a way that a time interval in a time corresponding to the selection time information having a high frequency of the selection will become shorter than a time interval in a time corresponding to the selection time information having a low frequency of the selection, and
the display still image acquisition unit acquires the display still image corresponding to the position determined by the acquisition position determination unit.

3. The video capture system according to claim 2, wherein the acquisition position determination unit determines the position on the time axis of the video in such a way that the time interval in the time corresponding to the selection time information having the low frequency of the selection will become longer than the time interval when the selection time information has not been recorded.

4. The video capture system according to claim 2, wherein the acquisition position determination unit determines the position on the time axis of the video in such a way that the time interval in the time corresponding to the selection time information having the low frequency of the selection will be substantially the same as the time interval when the selection time information has not been recorded.

5. The video capture system according to claim 2, wherein the display displays the plurality of display still images in such a way that a size of the display still image corresponding to the selection time information having the high frequency of the selection will become greater than a size of the display still image corresponding to the selection time information having the low frequency of the selection.

6. The video capture system according to claim 1, wherein the history includes selection time information corresponding to the time information of the selected display still image, the information processing terminal further comprises:
an acquisition position determination unit realized by the integrated circuit configured to determine positions on a time axis of the video respectively corresponding to the display still images which should be acquired by the display still image acquisition unit in such a way that the number of the display still images corresponding to the time information having a low frequency of the selection will be reduced, and the display still image acquisition unit acquires the display still image corresponding to the position determined by the acquisition position determination unit.

7. The video capture system according to claim 6, further comprising:
a still image extraction unit realized by the integrated circuit configured to extract a plurality of still images at predetermined time intervals from the video captured by the image pickup apparatus, wherein the acquisition position determination unit determines the position on the time axis of the video in such a way that the number of the display still images corresponding to the time information having a low frequency of the selection will be smaller than the number of the still images corresponding to the time information having a low frequency of the selection.

8. An information processing terminal comprising:
a stop instruction unit realized by an integrated circuit configured to instruct an image pickup apparatus to stop capturing video;

a display still image acquisition unit realized by the integrated circuit configured to acquire a plurality of display still images, including time information relating to a time in the video, in response to a stop instruction from the stop instruction unit, the plurality of display still images being extracted from the video captured by the image pickup apparatus;

a display configured to display a list of the plurality of display still images acquired by the display still image acquisition unit; and a selection unit realized by the integrated circuit configured to select at least one display still image from the plurality of display still images displayed on the display unit; and a history record unit realized by the integrated circuit configured to record a history of a selection based on the time information relating to the display still image selected by the selection unit, and the display still image acquisition unit acquires the display still image according to the history recorded by the history record unit.

9. A video capture system comprising:
a capture unit configured to capture a video;
a stop instruction unit realized by the integrated circuit configured to instruct the capture unit to stop capturing the video;

a display still image acquisition unit realized by the integrated circuit configured to acquire a plurality of display still images, including time information relating to a time in the video, in response to a stop instruction from the stop instruction unit, the plurality of display still images being extracted from the video captured by the capture unit;

a display configured to display a list of the plurality of display still images acquired by the display still image acquisition unit;

a selection unit realized by the integrated circuit configured to select at least one display still image from the plurality of display still images displayed on the display unit;

a history record unit realized by the integrated circuit configured to record a history of a selection based on the time information relating to the display still image selected by the selection unit, and wherein the display still image acquisition unit acquires the display still image according to the history recorded by the history record unit.

10. A method of checking video comprising:
instructing an image pickup apparatus to stop capturing video, the image pickup apparatus being for capturing the video;

acquiring a plurality of display still images, including time information relating to a time in the video, from the video in response to a stop instruction, the plurality of display still images being extracted from the video captured by the image pickup apparatus;

displaying a list of the plurality of the acquired display still images;

selecting at least one display still image from the plurality of displayed still images; and recording a history of a selection based on the time information relating to the selected display still image, wherein in the acquiring of the plurality of displayed still images, the plurality of displayed still images are acquired according to the recorded history.

11. A non-transitory computer readable medium storing a program to cause a computer to execute:
instructing an image pickup apparatus to stop capturing video, the image pickup apparatus being for capturing the video;

acquiring a plurality of display still images, including time information relating to a time in the video, from the video in response to a stop instruction, the plurality of display still images being extracted from the video captured by the image pickup apparatus;

displaying a list of the plurality of the acquired display still images;

selecting at least one display still image from the plurality of displayed still images; and recording a history of a selection based on the time information relating to the selected display still image, wherein in the acquiring of the plurality of displayed still images, the plurality of displayed still images are acquired according to the recorded history.

* * * * *